(12) United States Patent
Moon et al.

(10) Patent No.: US 11,960,688 B2
(45) Date of Patent: Apr. 16, 2024

(54) TOUCH SENSOR AND TOUCH INPUT DEVICE COMPRISING SAME

(71) Applicant: HiDeep Inc., Seongnam-si (KR)

(72) Inventors: Hojun Moon, Seongnam-si (KR); Bonkee Kim, Seongnam-si (KR); Seyeob Kim, Seongnam-si (KR); Inseob Kim, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 18/002,807

(22) PCT Filed: May 12, 2021

(86) PCT No.: PCT/KR2021/005926
§ 371 (c)(1),
(2) Date: Dec. 21, 2022

(87) PCT Pub. No.: WO2022/010084
PCT Pub. Date: Jan. 13, 2022

(65) Prior Publication Data
US 2023/0244349 A1    Aug. 3, 2023

(30) Foreign Application Priority Data

Jul. 9, 2020   (KR) ........................ 10-2020-0084543
Sep. 1, 2020   (KR) ........................ 10-2020-0110776

(51) Int. Cl.
*G06F 3/041*    (2006.01)
*G06F 3/044*    (2006.01)

(52) U.S. Cl.
CPC .......... *G06F 3/0443* (2019.05); *G06F 3/0416* (2013.01)

(58) Field of Classification Search
CPC .............................. G06F 3/0416; G06F 3/0443
See application file for complete search history.

(56) References Cited

U.S. PATENT DOCUMENTS

| | | | |
|---|---|---|---|
| 2008/0007539 A1* | 1/2008 | Hotelling | G06F 3/0443 |
| | | | 345/173 |
| 2008/0047765 A1* | 2/2008 | Proctor | G06F 3/03547 |
| | | | 178/18.06 |
| 2015/0212627 A1* | 7/2015 | Hotelling | G06F 3/0445 |
| | | | 345/174 |
| 2016/0048246 A1* | 2/2016 | Park | G06F 3/04166 |
| | | | 345/173 |
| 2016/0124554 A1* | 5/2016 | Lewis | G09G 5/003 |
| | | | 345/174 |

(Continued)

FOREIGN PATENT DOCUMENTS

| | | |
|---|---|---|
| KR | 20150115104 A | 10/2015 |
| KR | 20160117719 A | 10/2016 |

(Continued)

*Primary Examiner* — Ryan A Lubit
(74) *Attorney, Agent, or Firm* — The Belles Group, P.C.

(57) ABSTRACT

The present invention relates to a touch sensor and a touch input device and, more specifically, to a touch sensor formed of a circular single layer and a touch input device comprising same. A touch input device, according to one embodiment of the present invention, comprises a circular touch sensor, wherein the touch sensor includes a plurality of electrodes disposed on a single layer and spaced apart from each other on a plurality of virtual circles having a common center.

19 Claims, 31 Drawing Sheets

(56) References Cited

U.S. PATENT DOCUMENTS

| | | | |
|---|---|---|---|
| 2016/0202826 A1* | 7/2016 | Han | G06F 3/0412 345/174 |
| 2016/0291710 A1* | 10/2016 | Kang | G06F 3/0487 |
| 2016/0291737 A1 | 10/2016 | Hirakawa | |
| 2020/0012371 A1* | 1/2020 | Yang | H10K 59/40 |

FOREIGN PATENT DOCUMENTS

| KR | 20200042876 A | 4/2020 |
|---|---|---|
| KR | 20210125649 A | 10/2021 |

* cited by examiner

【Figure 1】
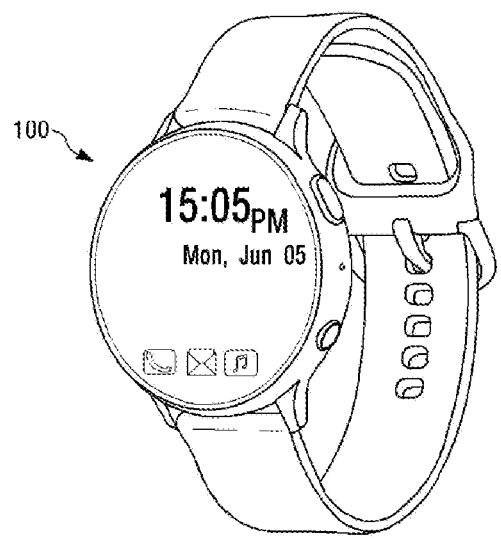
【Figure 2】
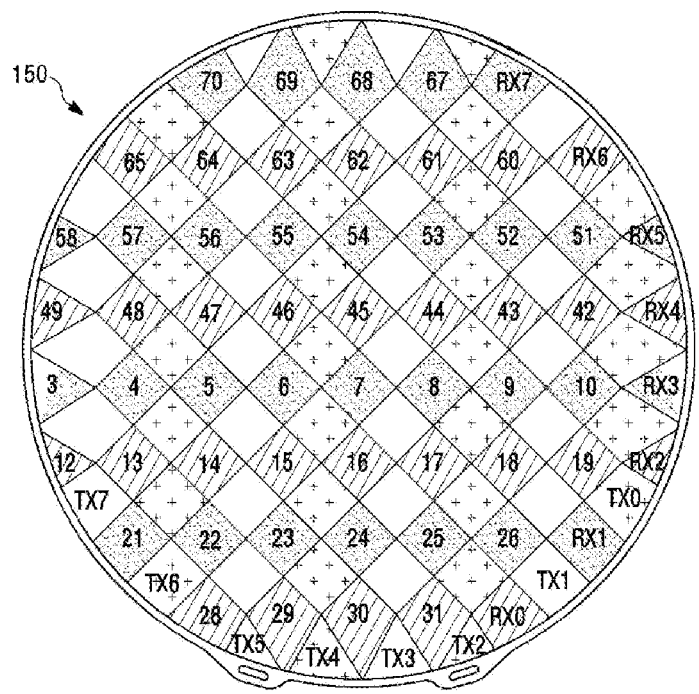

【Figure 3】
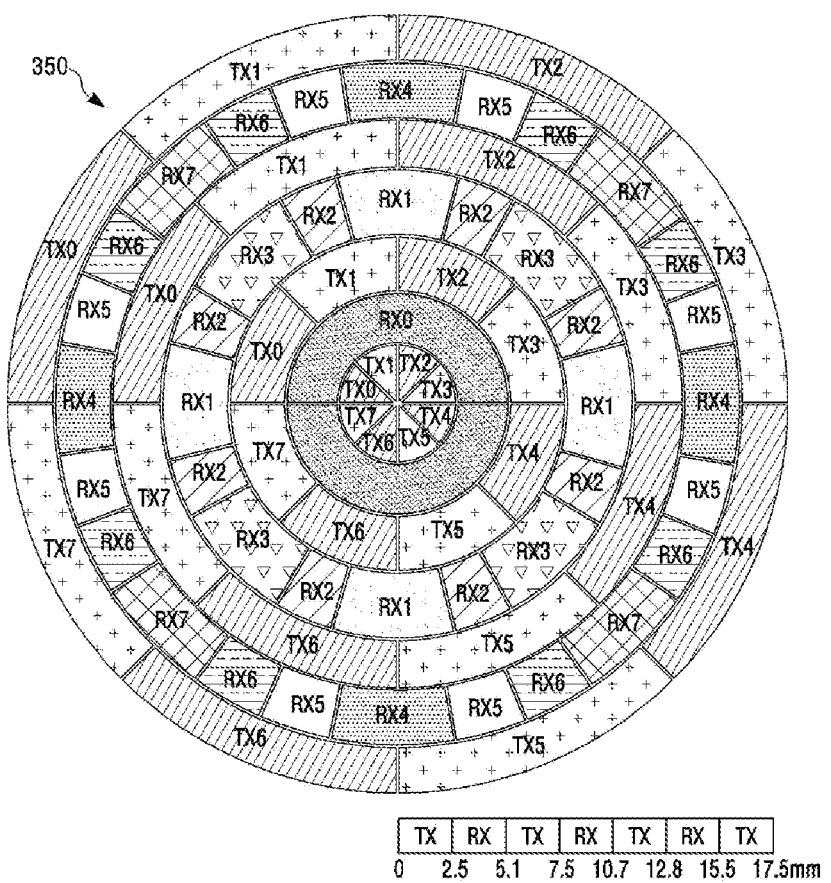

[Figure 4]
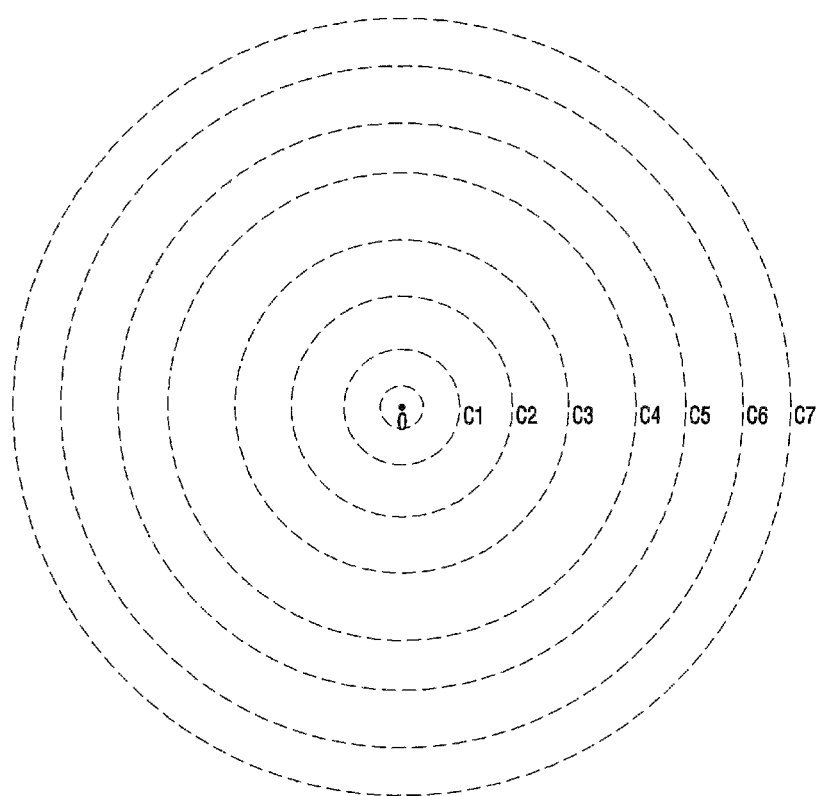

[Figure 5]
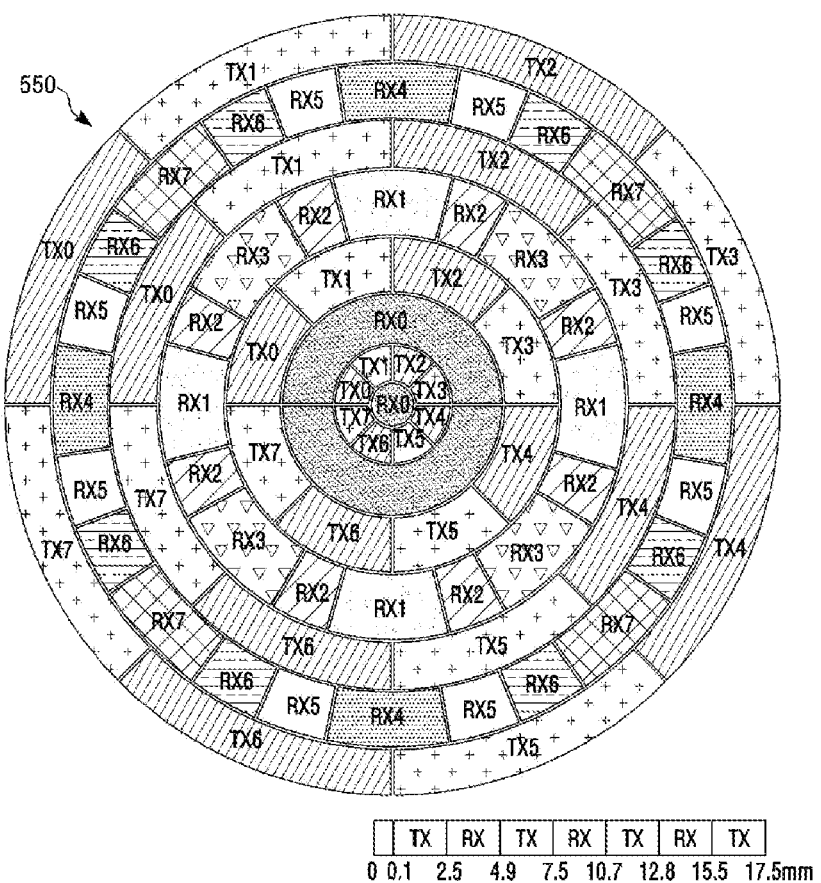
[Figure 6]
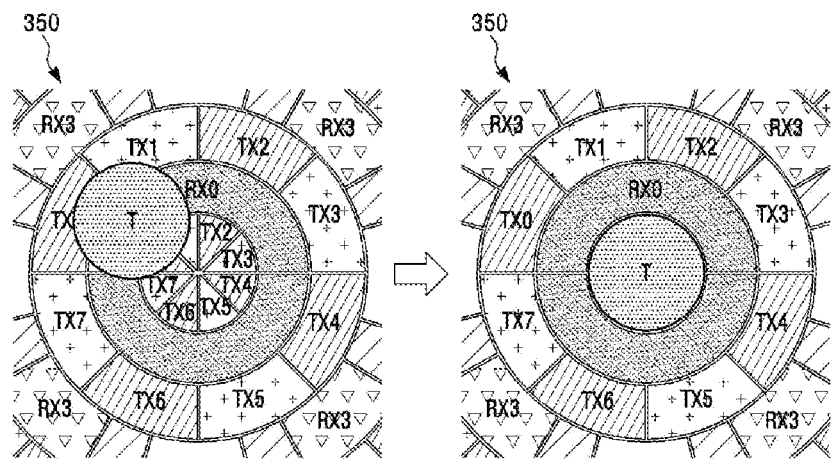

【Figure 7】
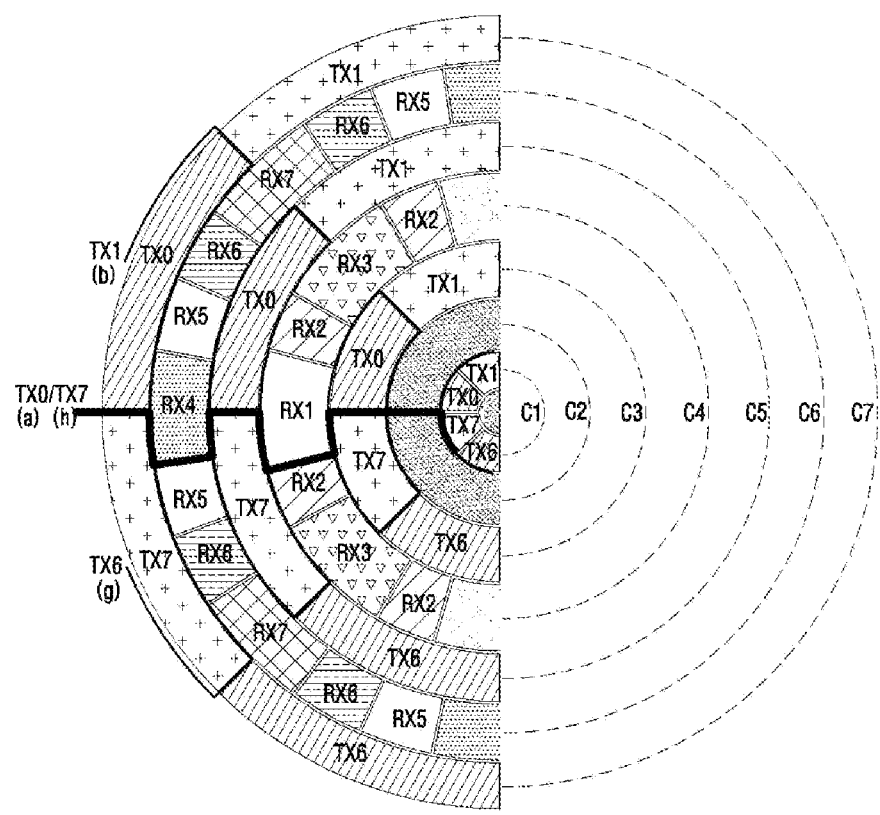

【Figure 8】
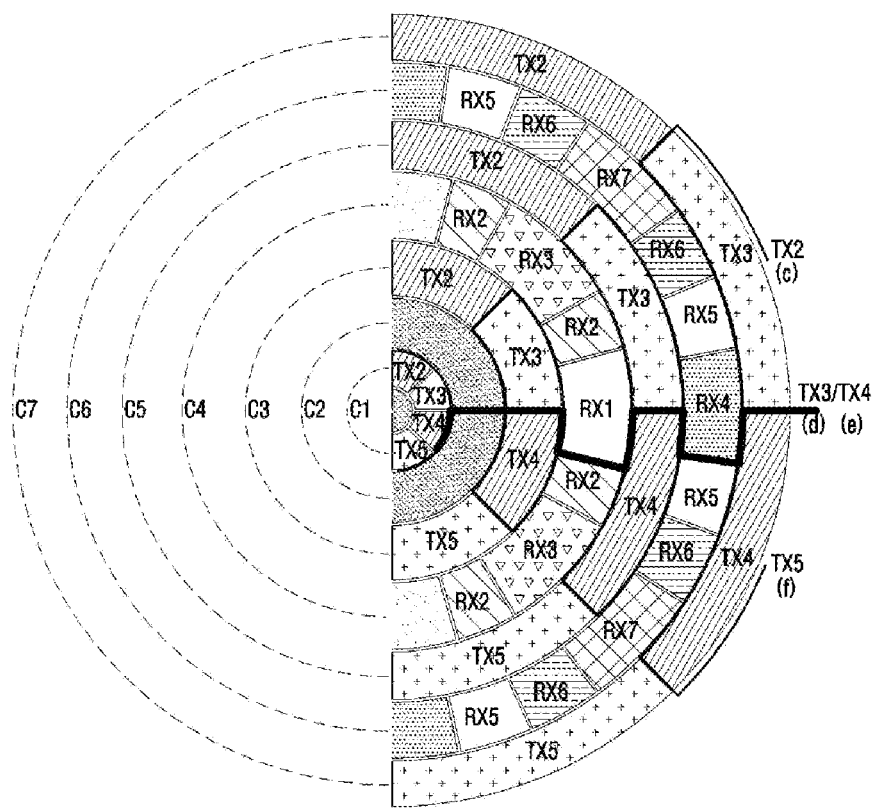

【Figure 9】
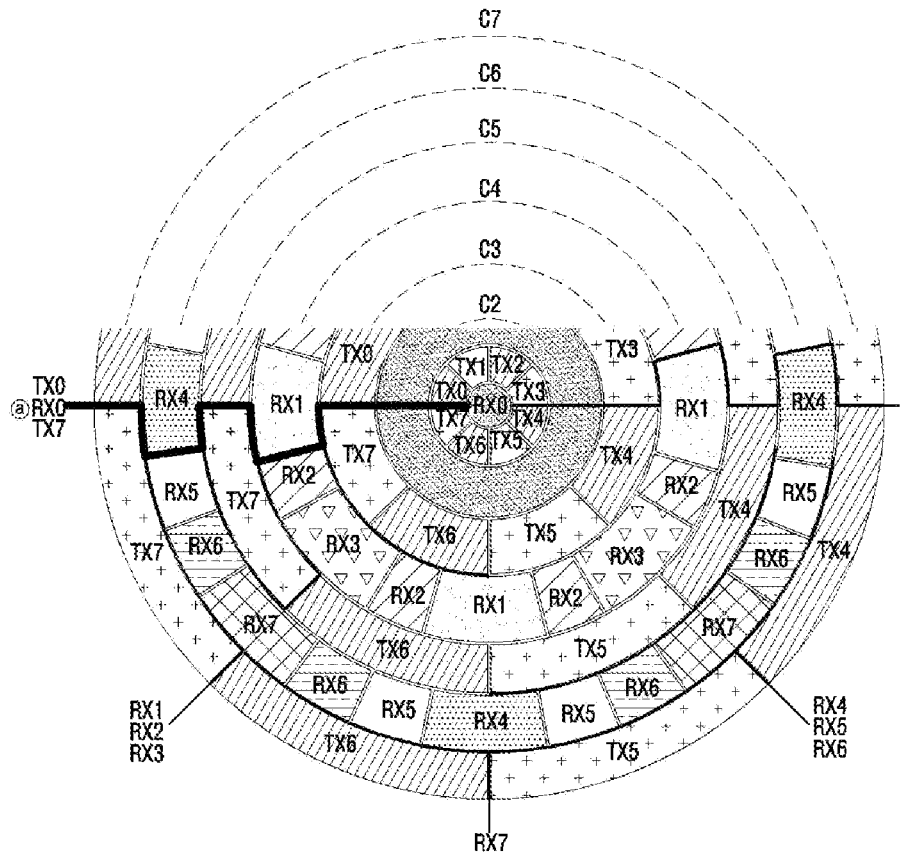
【Figure 10】
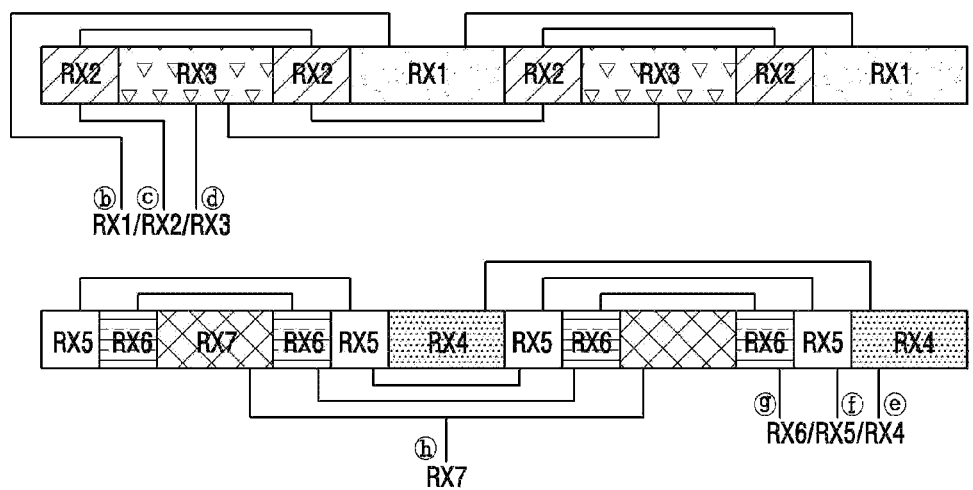

【Figure 11】
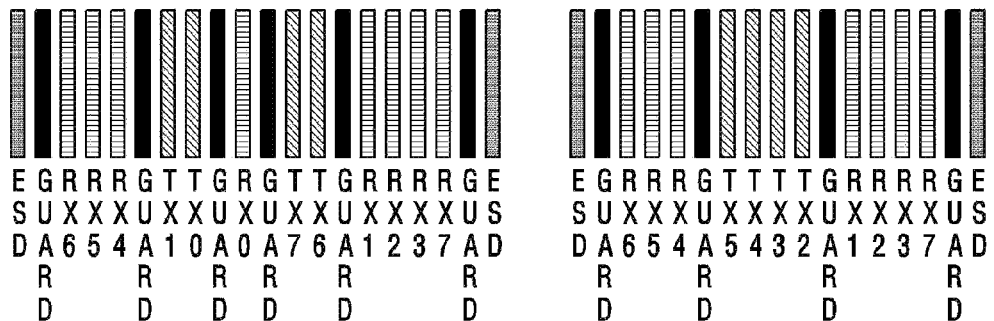
【Figure 12】
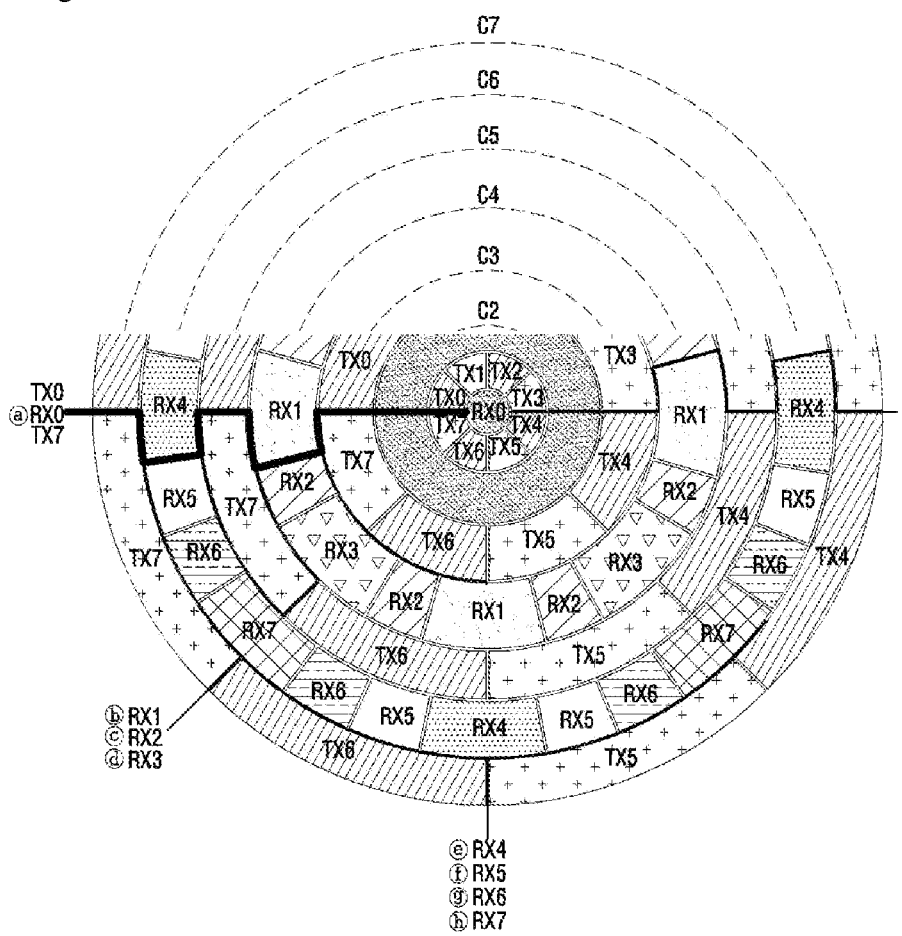

[Figure 13]
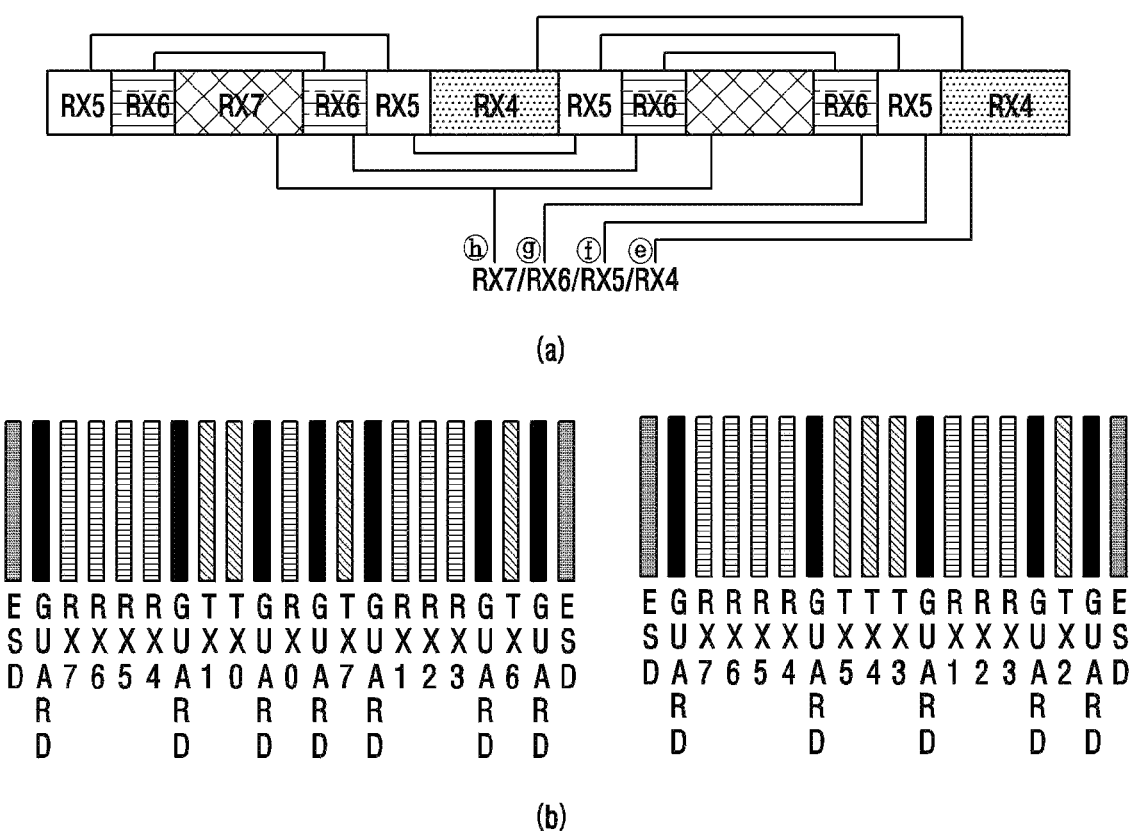

【Figure 14】
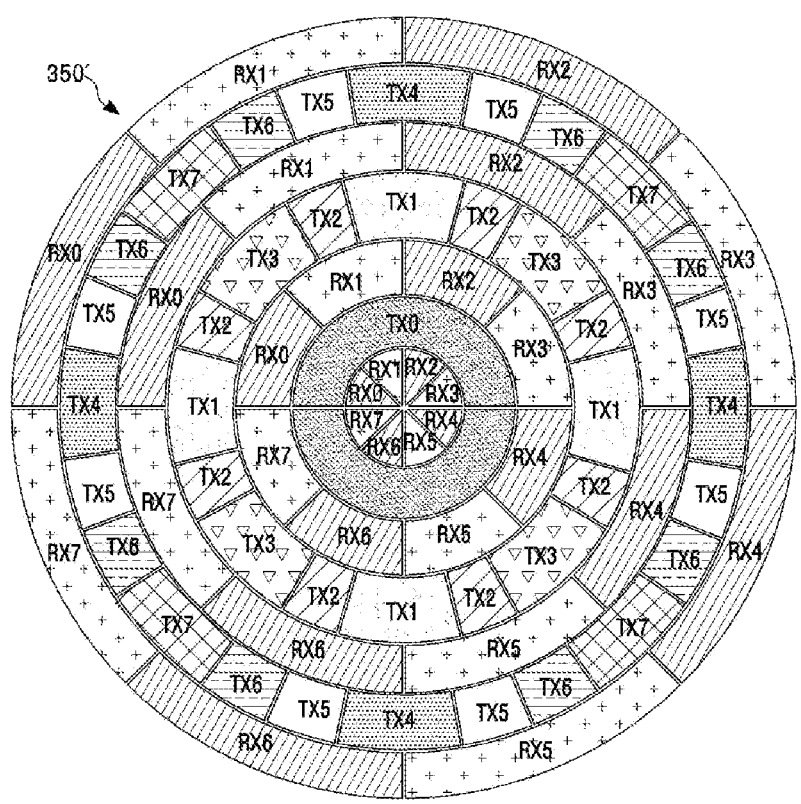

[Figure 15]
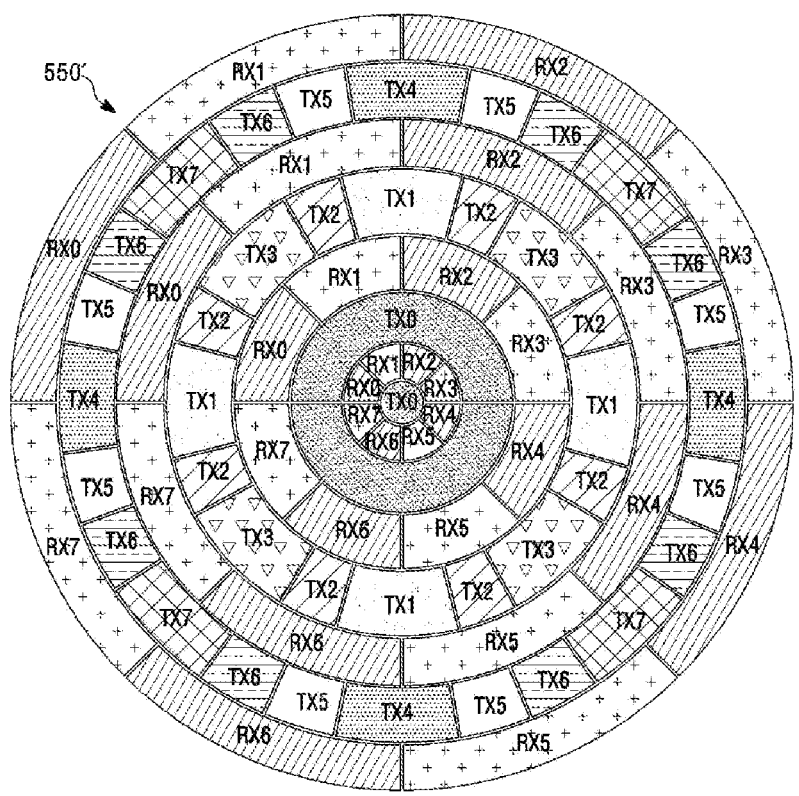

【Figure 16】
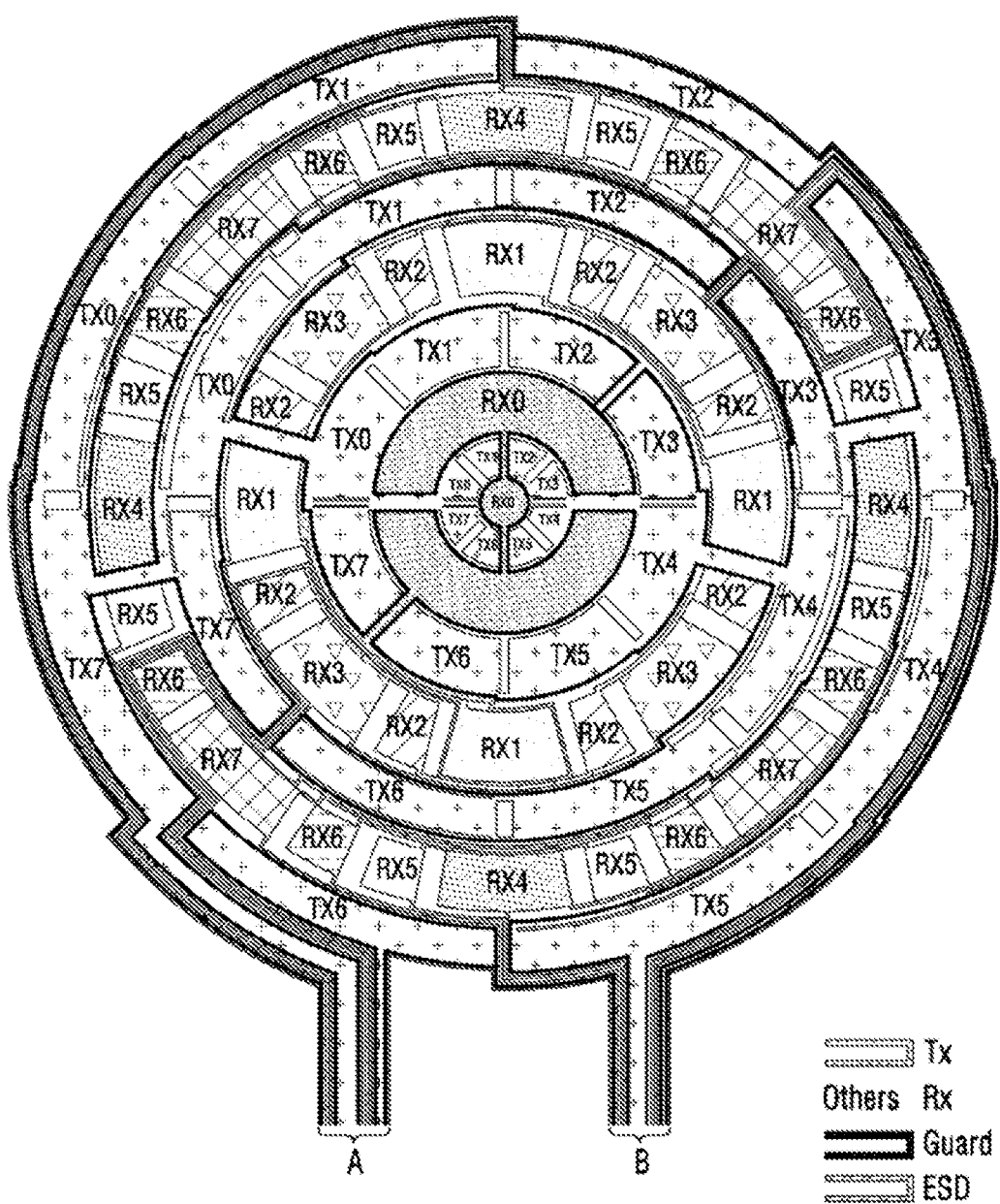

【Figure 17A】
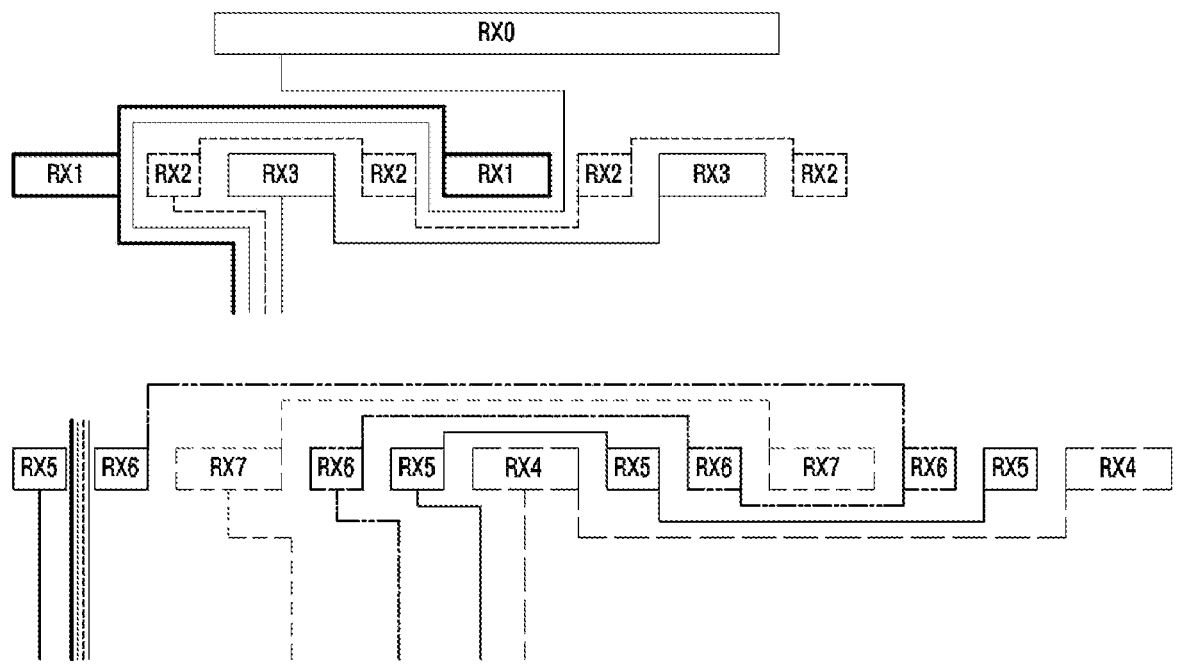

[Figure 17B]
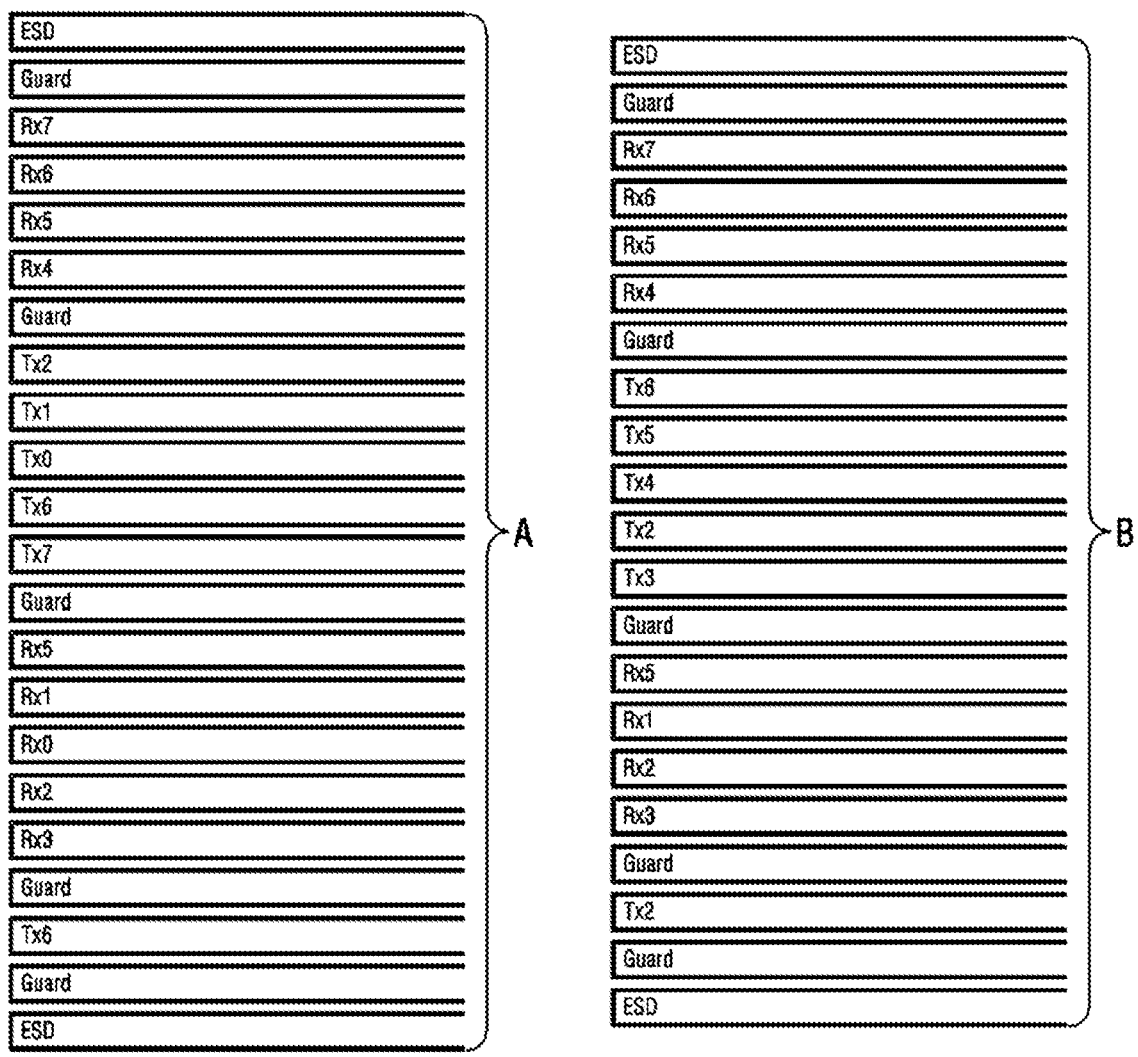

【Figure 18A】
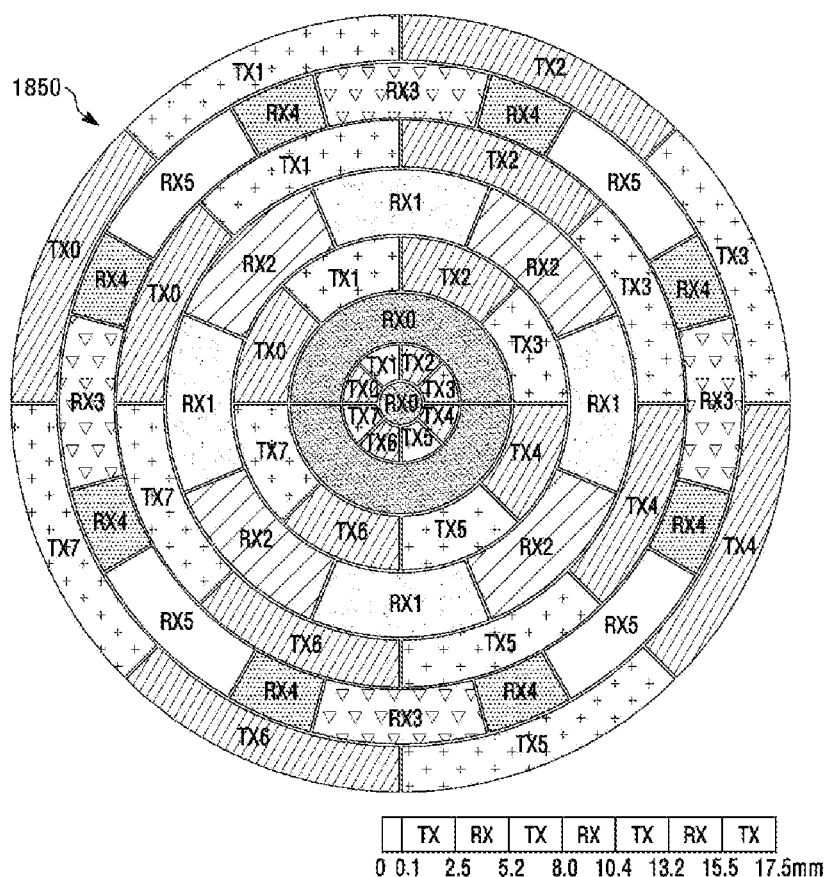

【Figure 18B】
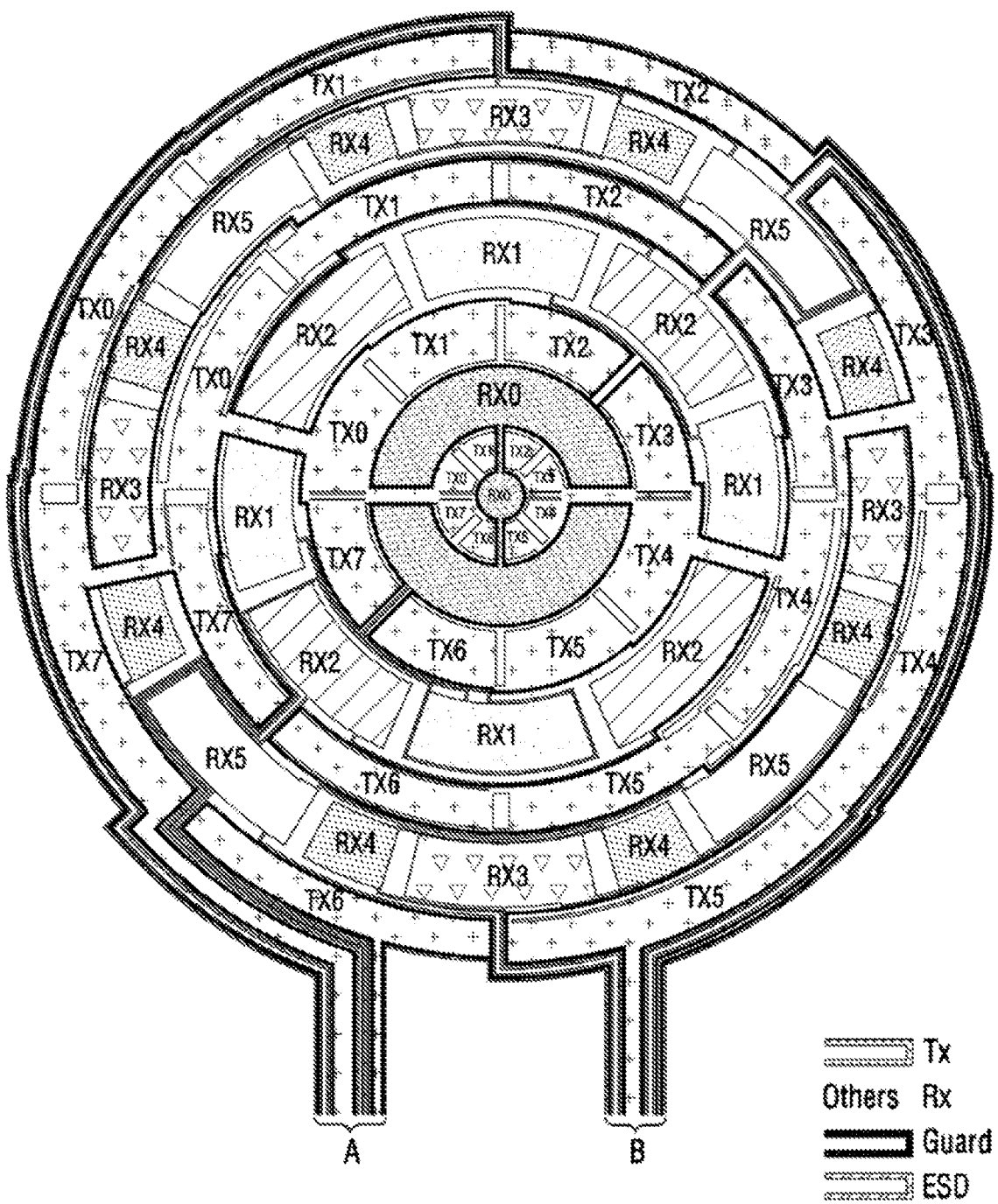

【Figure 18C】
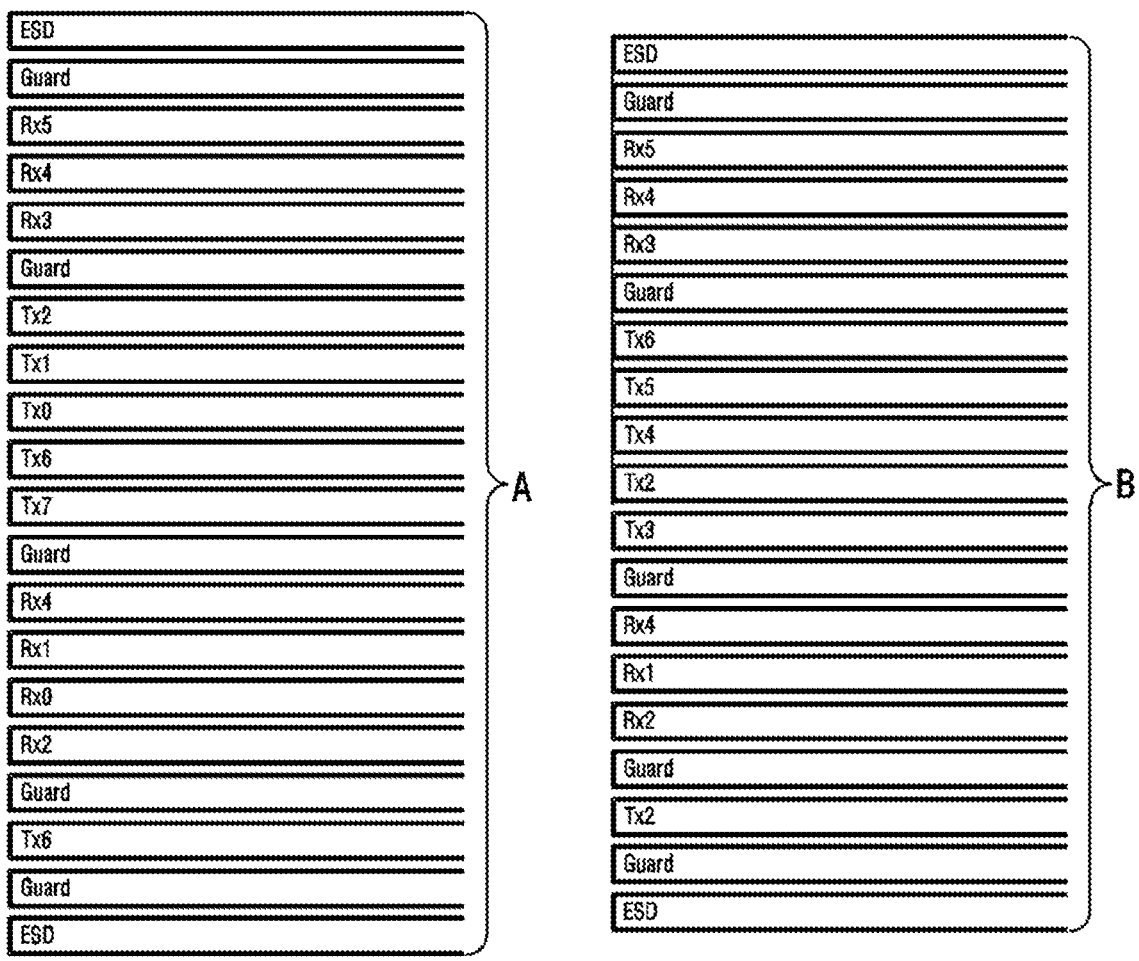

【Figure 19】
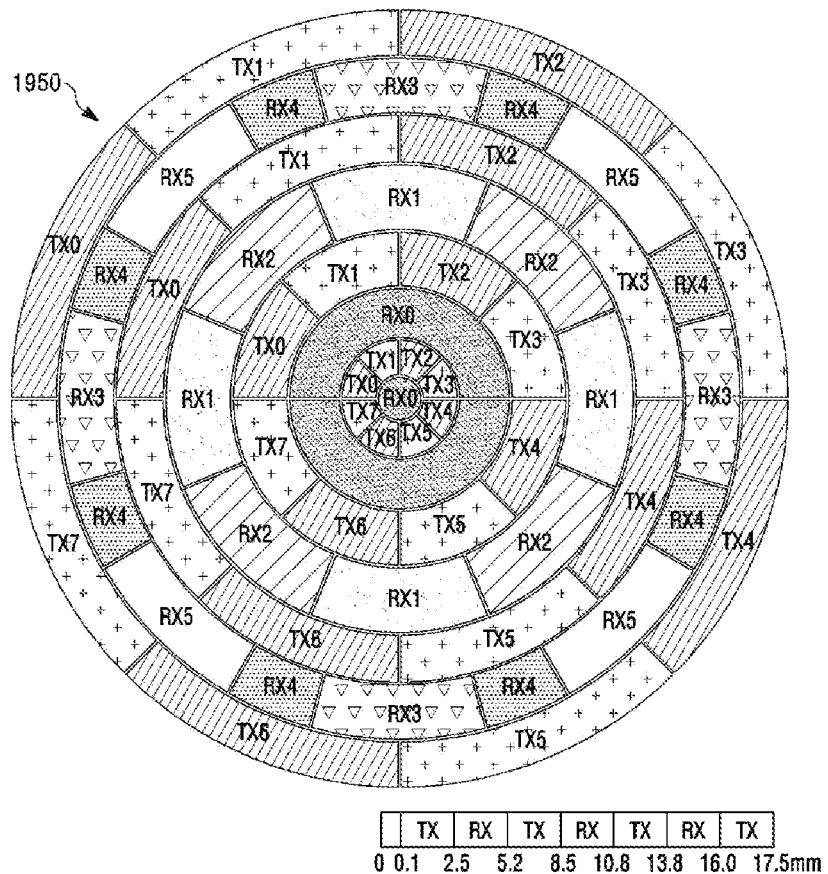
【Figure 20】
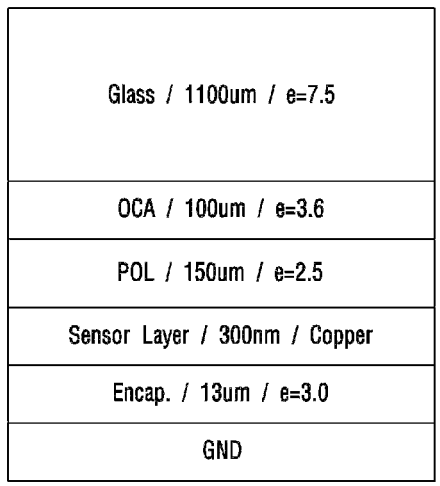

[Figure 21]
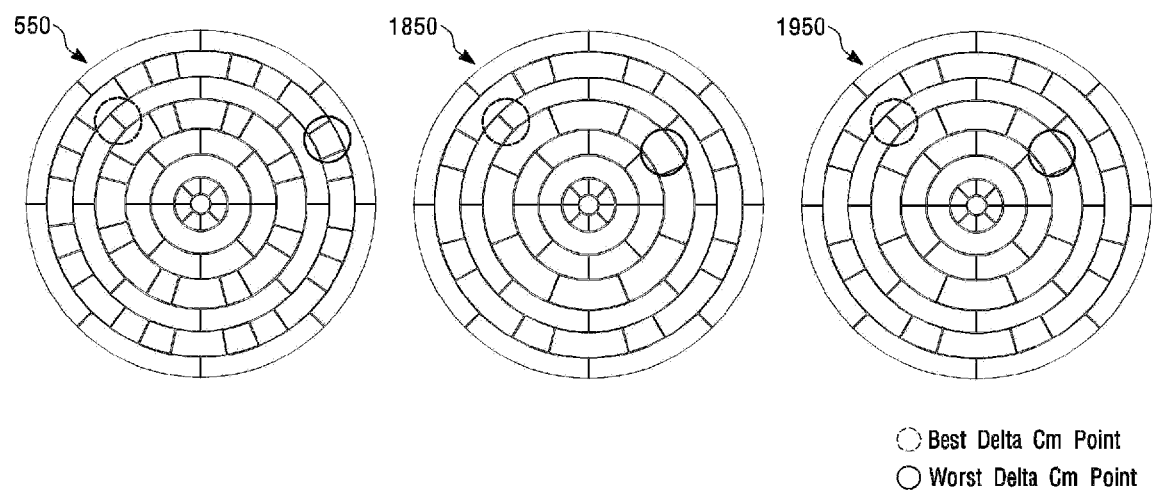

| Cm (fF) | Rx0 | Rx1 | Rx2 | Rx3 | Rx4 | Rx5 | Rx6 | Rx7 |
|---|---|---|---|---|---|---|---|---|
| Tx0 | 156 | 175 | 216 | 209 | 250 | 252 | 203 | 189 |
| Tx1 | 238 | 178 | 221 | 203 | 238 | 195 | 206 | 239 |
| Tx2 | 293 | 182 | 155 | 197 | 239 | 236 | 178 | 228 |
| Tx3 | 178 | 188 | 218 | 179 | 264 | 222 | 258 | 258 |
| Tx4 | 243 | 167 | 237 | 165 | 205 | 210 | 199 | 183 |
| Tx5 | 253 | 163 | 190 | 189 | 254 | 235 | 263 | 207 |
| Tx6 | 216 | 177 | 166 | 198 | 263 | 226 | 197 | 193 |
| Tx7 | 156 | 200 | 195 | 185 | 245 | 230 | 229 | 216 |

Average Cm: 211 (fF)

(b)

| Cm (fF) | Rx0 | Rx1 | Rx2 | Rx3 | Rx4 | Rx5 |
|---|---|---|---|---|---|---|
| Tx0 | 231 | 290 | 310 | 290 | 330 | 286 |
| Tx1 | 286 | 310 | 264 | 245 | 324 | 239 |
| Tx2 | 252 | 288 | 292 | 277 | 333 | 312 |
| Tx3 | 141 | 252 | 255 | 295 | 308 | 254 |
| Tx4 | 181 | 303 | 312 | 279 | 333 | 309 |
| Tx5 | 264 | 329 | 309 | 309 | 279 | 303 |
| Tx6 | 259 | 315 | 330 | 289 | 310 | 319 |
| Tx7 | 172 | 287 | 315 | 272 | 308 | 307 |

Average Cm: 285 (fF)

(c)

| Cm (fF) | Rx0 | Rx1 | Rx2 | Rx3 | Rx4 | Rx5 |
|---|---|---|---|---|---|---|
| Tx0 | 239 | 349 | 348 | 318 | 265 | 339 |
| Tx1 | 269 | 323 | 314 | 340 | 252 | 317 |
| Tx2 | 273 | 312 | 285 | 338 | 267 | 316 |
| Tx3 | 222 | 288 | 217 | 312 | 269 | 254 |
| Tx4 | 184 | 336 | 328 | 322 | 281 | 266 |
| Tx5 | 280 | 335 | 338 | 333 | 278 | 302 |
| Tx6 | 285 | 351 | 336 | 268 | 280 | 377 |
| Tx7 | 203 | 317 | 317 | 295 | 274 | 310 |

Average Cm: 295 (fF)

| | Cs(pF) |
|---|---|
| TX0 | 103.7 |
| TX1 | 103.7 |
| TX2 | 103.6 |
| TX3 | 103.6 |
| TX4 | 103.5 |
| TX5 | 103.7 |
| TX6 | 103.6 |
| TX7 | 103.6 |

| | Cs(pF) |
|---|---|
| RX0 | 102.5 |
| RX1 | 107.6 |
| RX2 | 102.2 |
| RX3 | 107.7 |
| RX4 | 104.8 |
| RX5 | 100.0 |
| RX6 | 100.0 |
| RX7 | 104.7 |

(a)

| | Cs(pF) |
|---|---|
| TX0 | 125.1 |
| TX1 | 124.4 |
| TX2 | 124.3 |
| TX3 | 123.3 |
| TX4 | 119.3 |
| TX5 | 123.3 |
| TX6 | 124.2 |
| TX7 | 124.2 |

| | Cs(pF) |
|---|---|
| RX0 | 124.3 |
| RX1 | 124.6 |
| RX2 | 124.2 |
| RX3 | 124.2 |
| RX4 | 124.3 |
| RX5 | 124.2 |

(b)

| | Cs(pF) |
|---|---|
| TX0 | 123.8 |
| TX1 | 123.7 |
| TX2 | 123.7 |
| TX3 | 123.6 |
| TX4 | 123.6 |
| TX5 | 123.8 |
| TX6 | 123.8 |
| TX7 | 123.7 |

| | Cs(pF) |
|---|---|
| RX0 | 124.9 |
| RX1 | 124.4 |
| RX2 | 124.4 |
| RX3 | 122.1 |
| RX4 | 118.1 |
| RX5 | 122.1 |

(c)

【Figure 25】
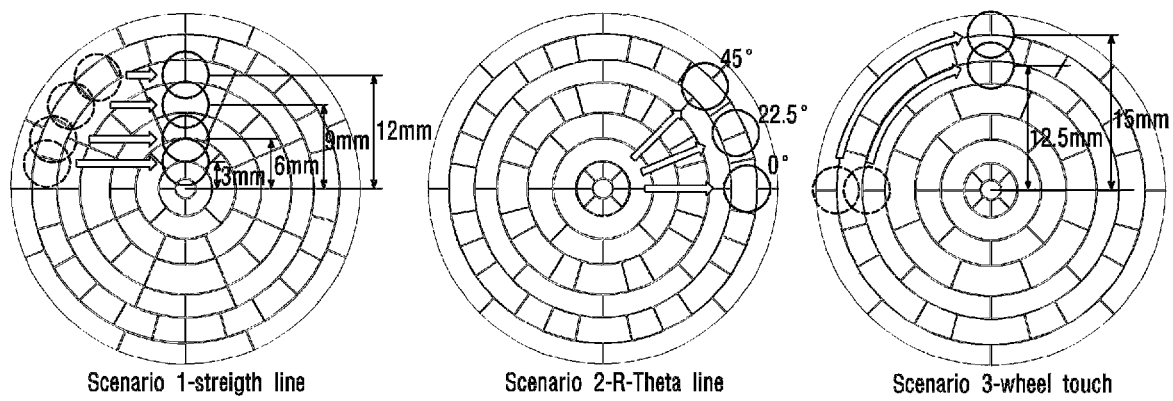
Scenario 1-streigth line　　Scenario 2-R-Theta line　　Scenario 3-wheel touch

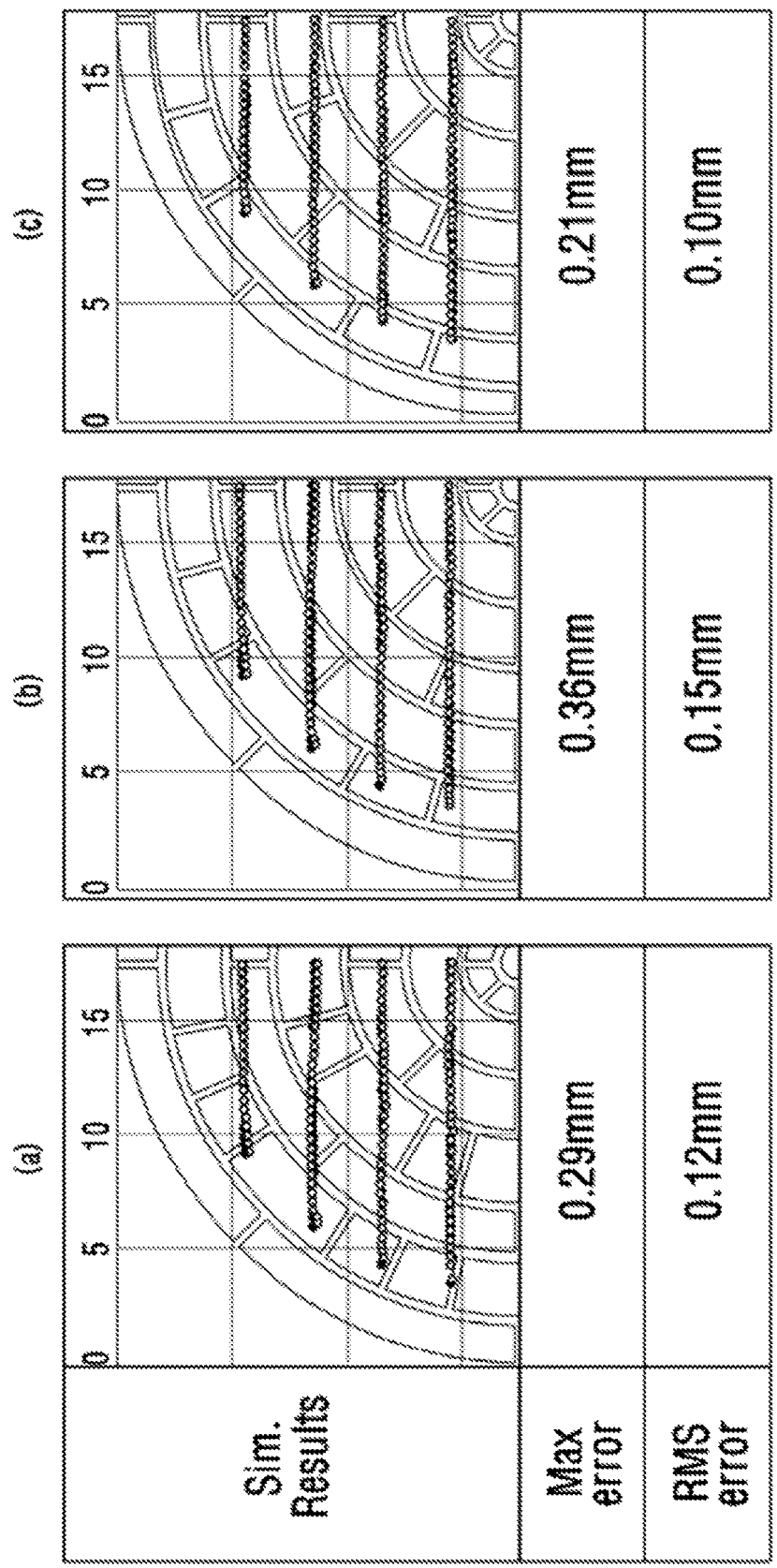
[Figure 26]

【Figure 27】
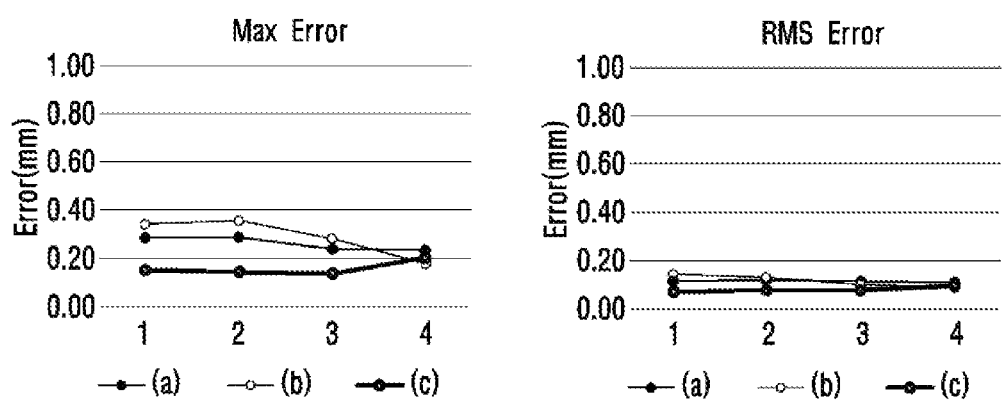

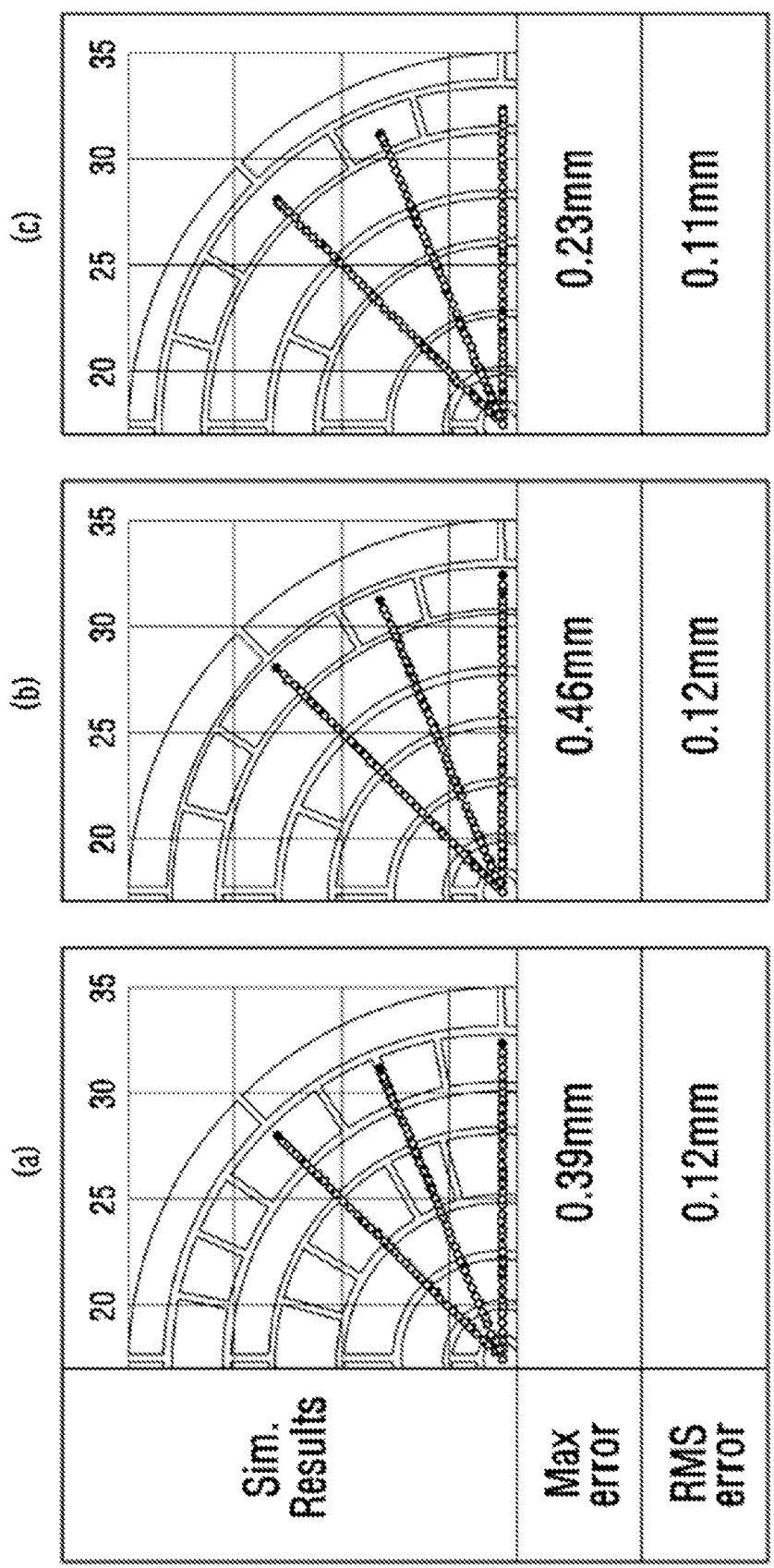
[Figure 28]

【Figure 29】
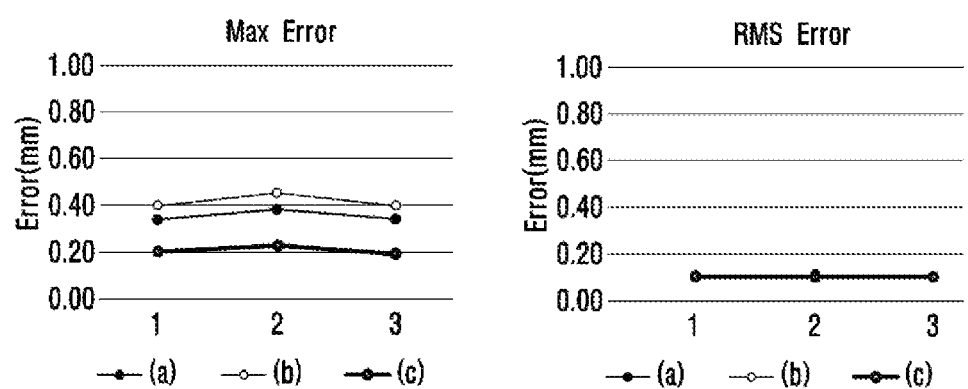

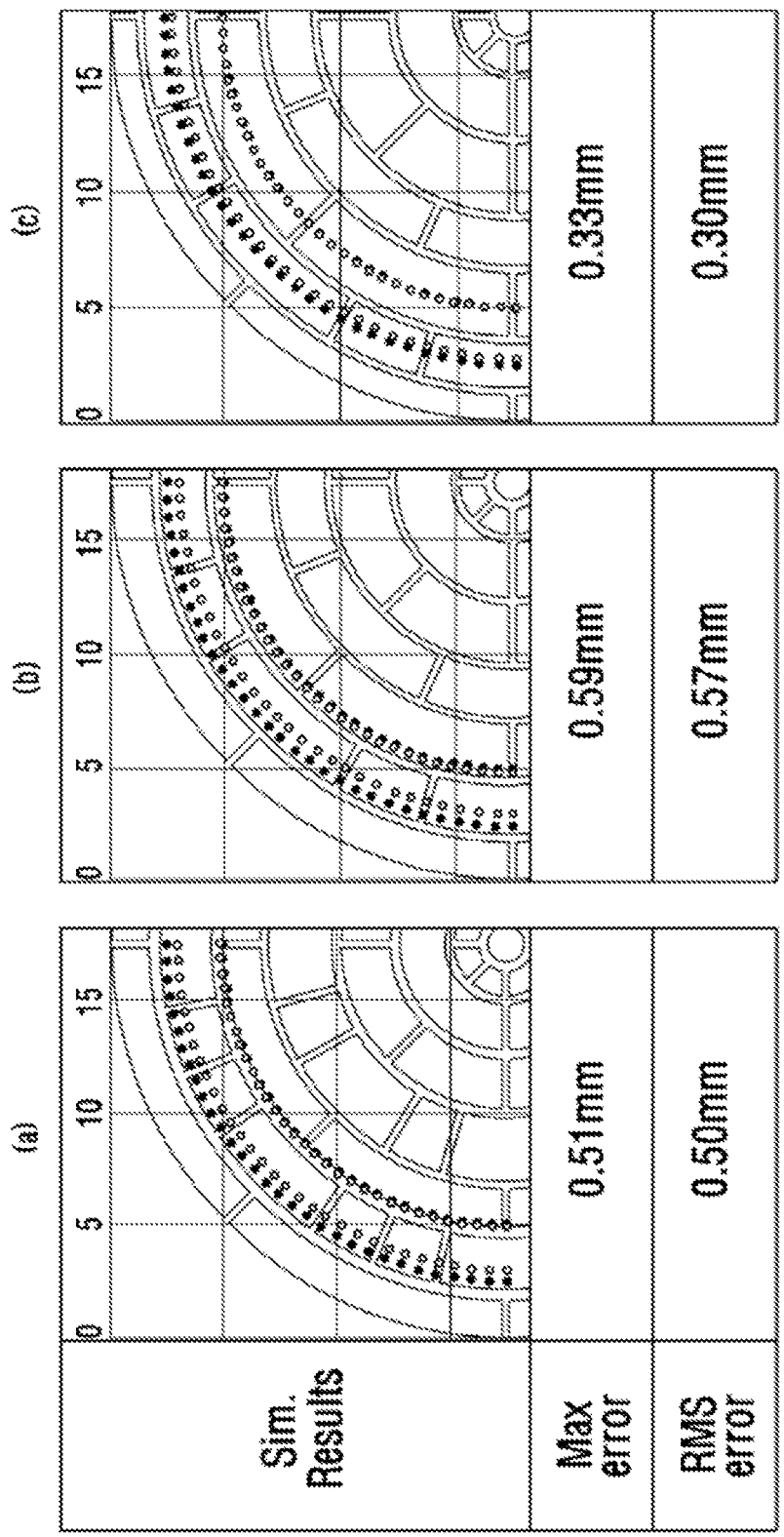
[Figure 30]

【Figure 31】
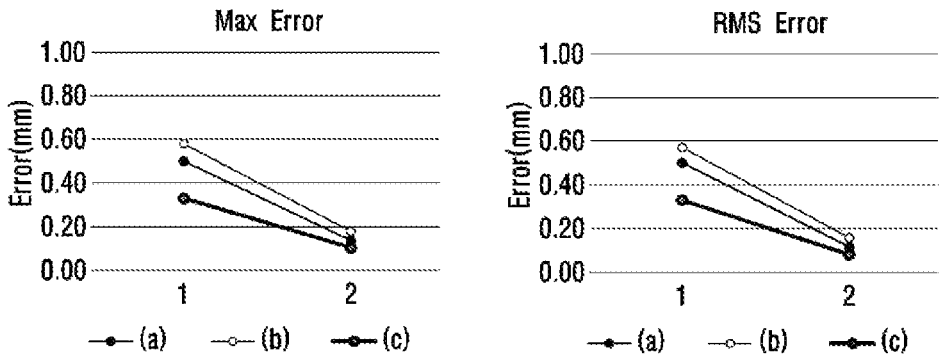
【Figure 32】
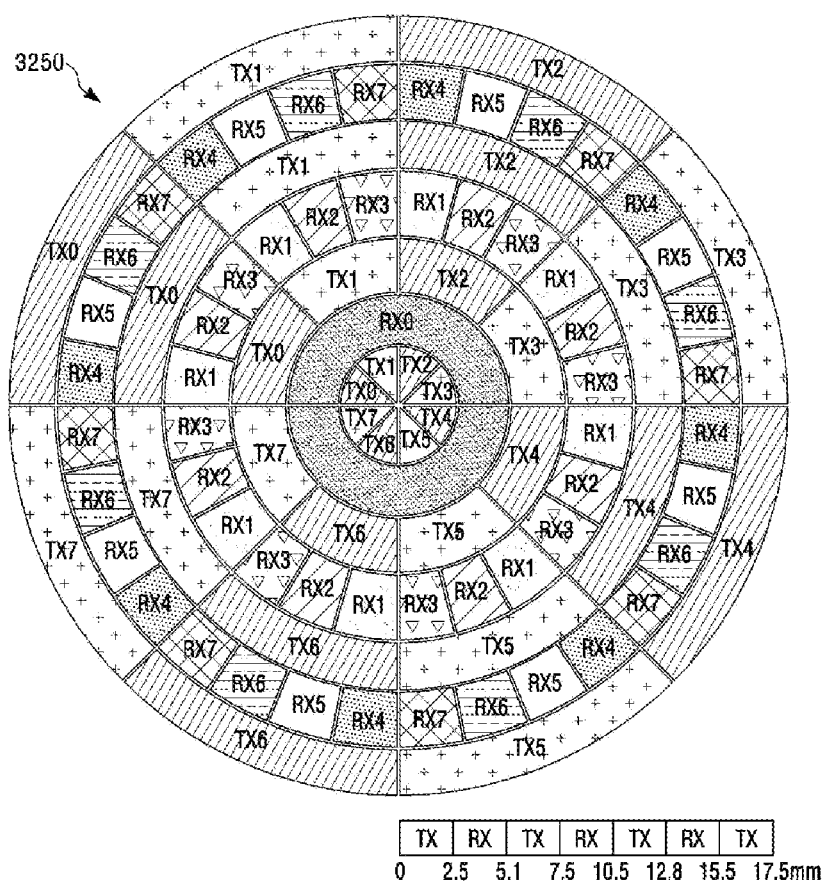

【Figure 33】
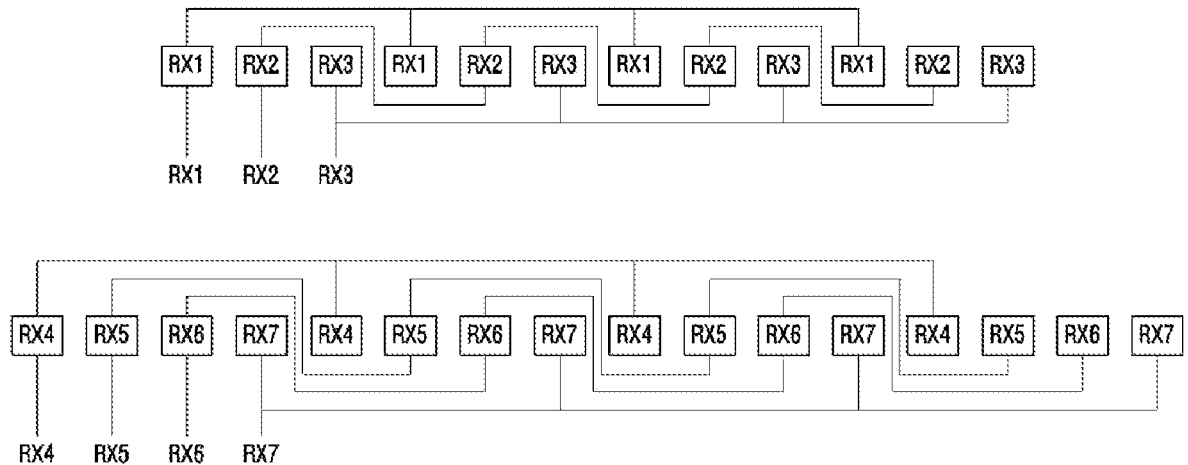
【Figure 34】
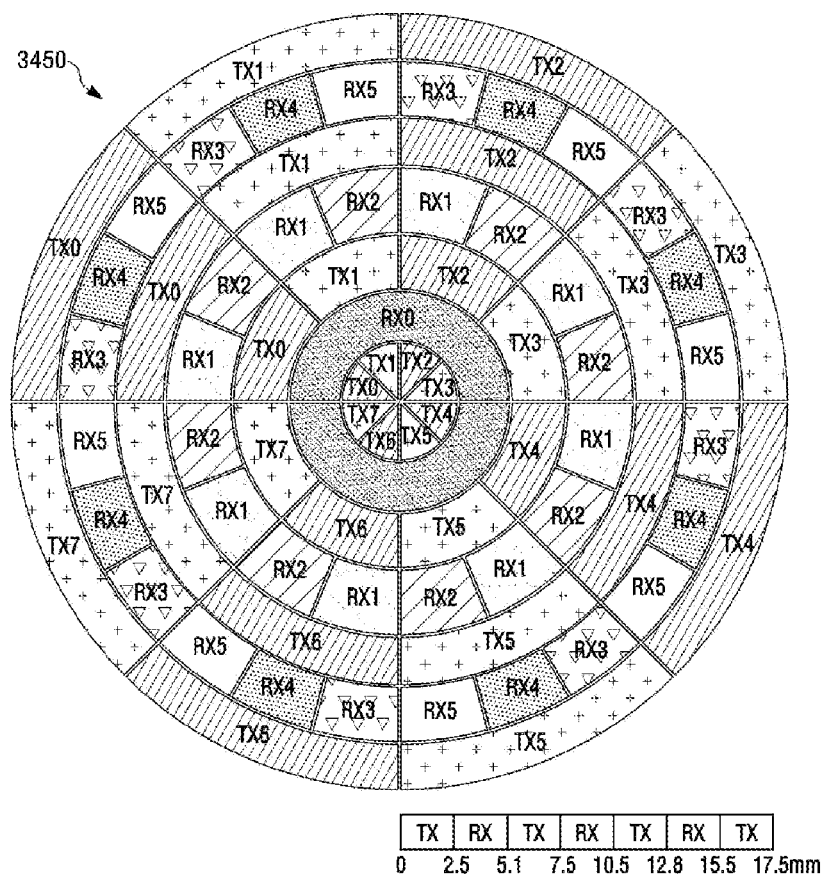

[Figure 35]
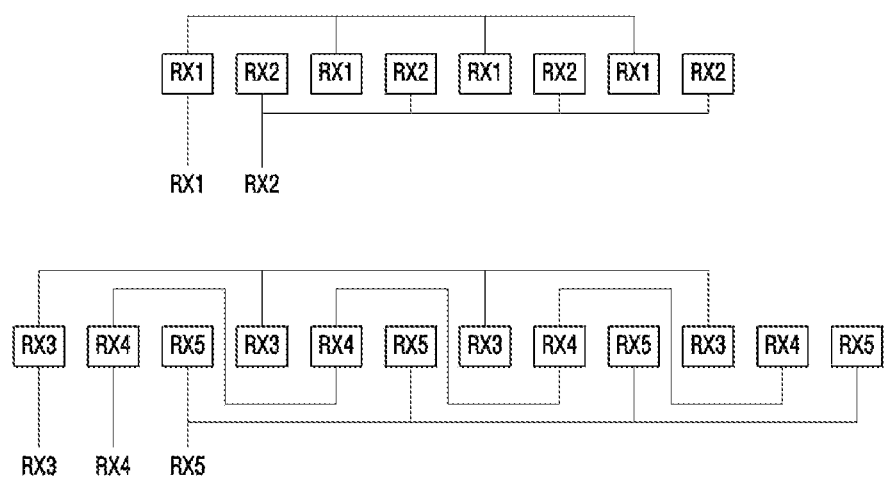

TOUCH SENSOR AND TOUCH INPUT DEVICE COMPRISING SAME

CROSS-REFERENCE TO RELATED PATENT APPLICATIONS

The present application is a U.S. national stage application under 35 U.S.C. § 371 of PCT Application No. PCT/KR2021/005926, filed May 12, 2021, which claims priority to Korean Patent Application No. 10-2020-0084543, filed Jul. 9, 2020, and Korean Patent Application No. 10-2020-0110776, filed Sep. 1, 2020. The disclosures of the aforementioned priority applications are incorporated herein by reference in their entireties.

TECHNICAL FIELD

The present invention relates to a touch sensor and a touch input device, and more particularly, to a circular touch sensor and a touch input device including the same.

BACKGROUND ART

Various types of touch input devices are used to operate a computing system. For example, input devices such as buttons, keys, joysticks, and touch screens are being used. Due to the easy and convenient operation of the touch screen, the use of the touch screen is increasing when operating the computing system.

With the development of technology, the development of a wearable computer is accelerating. A wearable computer represents a computer that can be worn on the body naturally, such as clothes, watches, glasses, and accessories.

Smartphones and tablet PCs can be conveniently used with just one finger or a touch pen, but there may be inconveniences in carrying them in a pocket or bag or carrying them in the hand.

On the other hand, wearable computers may be more easily portable than smartphones or tablet PCs because they can be worn on the wrist or worn like glasses. In particular, as a type of wearable computer and a type of touch input device, various products for a wristwatch, that is, a smartwatch, which can search for various services such as diary, messages, notifications, and stock prices wirelessly, are appearing. Especially, there are products having a circular touch screen among conventional smartwatches. An example will be described with reference to FIG. 1.

FIG. 1 is a perspective view of an example of a conventional smartwatch, and FIG. 2 is a view showing a pattern structure of a touch sensor included in the smartwatch shown in FIG. 1.

The smartwatch 100 shown in FIG. 1 may include a touch sensor 150 having a pattern as shown in FIG. 2.

In the pattern of the touch sensor 150 shown in FIG. 2, driving electrodes (TX0, TX1, TX2, TX3, TX4, TX5, TX6, TX7) are disposed on a single layer along the column direction, and receiving electrodes (RX0, RX1, RX2, RX3, RX4, RX5, RX6, RX7) are disposed along the row direction. As such, the touch sensor 150 shown in FIG. 2 includes the driving electrodes (TX0, TX1, TX2, TX3, TX4, TX5, TX6, TX7) and the receiving electrodes (RX0, RX1, RX2, RX3, RX4, RX5, RX6, RX7) are arranged to be orthogonal to each other (hereinafter, 'orthogonal pattern').

In the conventional touch sensor 150 with an orthogonal pattern structure shown in FIG. 2, touch electrodes (hereinafter, referred to as 'distorted electrodes') that do not have a complete rhombus shape are disposed on the edge of the touch sensor 150. Therefore, there is a problem in that the touch sensing performance is deteriorated at the edge portion where the distortion electrodes are located. Particularly, when the edge of the touch sensor 150 is slid clockwise or counterclockwise (hereinafter, 'wheel touch'), the sensing signal weakens or disappears, causing a problem in which a specific function by the wheel touch is not executed.

In addition, since the shape of the touch electrodes located in the center of the touch sensor 150 and the shape of the distorted electrodes are different, the amount of change in mutual capacitance (Cm) between the driving electrode and the receiving electrode adjacent to each other is not uniform when the touch sensor 150 is driven in a mutual mode.

In addition, when the touch sensor 150 is driven in a self mode (self mode) that senses a change in self-capacitance (self cap) by supplying a driving signal to both the driving electrodes and the receiving electrodes, the shape of the touch electrodes disposed on the center of the touch sensor 150 and the shape of the distorted electrodes are different, so there is a problem that the change in a self-capacitance (Cs) at all electrodes is not the same also.

In addition, it is important to reduce power consumption and have power consumption characteristics that are used continuously for a long time without charging, and there is a problem that unnecessary power consumption occurs to drive the distorted electrodes of the touch sensor 150.

DISCLOSURE

Technical Problem

An object to be achieved by the present invention is to provide a touch sensor capable of improving the touch sensing performance of an edge of a circular touch sensor and a touch input device including the same.

In addition, the problem to be solved by the present invention is to provide a touch sensor with a uniform amount of change in mutual capacitance (Cm) or/and self-capacitance (Cs) in each electrode in a circular touch sensor, and a touch input device including the same.

In addition, an object to be achieved by the present invention is to provide a touch sensor capable of reducing power consumption of a circular touch sensor and a touch input device including the same.

In addition, a touch sensor capable of sensing whether a circular touch sensor is touched in the center is provided, and a touch input device including the same.

In addition, a touch sensor capable of providing a routing method and a trace connection structure in a circular touch sensor, and a touch input device including the same are provided.

Technical Solution

A touch input device according to an embodiment of the present invention comprises a circular touch sensor, wherein the touch sensor includes a plurality of electrodes disposed on a single layer and arranged at predetermined intervals within a plurality of rings or a plurality of annular shapes having a common center.

Here, a circular electrode may be further disposed on the central portion of the touch sensor.

A touch input device according to another embodiment of the present invention comprises a circular touch sensor, wherein the touch sensor includes a plurality of electrodes disposed on a single layer and arranged to be spaced apart from each other on a plurality of virtual circles having a common center.

The touch sensor according to an embodiment of the present invention includes a plurality of first electrodes and a plurality of second electrodes. The plurality of first electrodes includes first electrodes of a first group; first electrodes of a second group surrounding the first electrodes of the first group; first electrodes of a third group surrounding the first electrodes of the second group; and first electrodes of a fourth group surrounding the first electrodes of the third group, The plurality of second electrodes includes one or a plurality of second-0th electrodes disposed between the first electrodes of the first group and the first electrodes of the second group; a plurality of second-1st electrodes, a plurality of second-2nd electrodes, and a plurality of second-3rd electrodes disposed between the first electrodes of the second group and the first electrodes of the third group; and a plurality of second-4th electrodes, a plurality of second-5th electrodes, a plurality of second-6th electrodes, and a plurality of second-7th electrodes disposed between the first electrodes of the third group and the first electrodes of the fourth group.

A touch sensor according to another embodiment of the present invention comprises a plurality of first electrodes and a plurality of second electrodes. The plurality of first electrodes includes first electrodes of a first group; first electrodes of a second group surrounding the first electrodes of the first group; first electrodes of a third group surrounding the first electrodes of the second group; and first electrodes of a fourth group surrounding the first electrodes of the third group. The plurality of second electrodes includes one or a plurality of second-0th electrodes disposed between the first electrodes of the first group and the first electrodes of the second group; a plurality of second-1st electrodes and a plurality of second-2nd electrodes disposed between the first electrodes of the second group and the first electrodes of the third group; and a plurality of second-3 electrodes, a plurality of second-4 electrodes, and a plurality of second-5 electrodes disposed between the first electrodes of the third group and the first electrodes of the fourth group.

Advantageous Effects

The use of the touch input device according to the embodiment of the present invention has the advantage of improving the touch sensing performance of the edge part of the circular touch sensor.

In addition, there is an advantage that the amount of change in mutual capacitance (Cm) and/or the amount of change in a self-capacitance (Cs) in each electrode in the circular touch sensor is uniform.

In addition, there is an advantage of reducing power consumption of the circular touch sensor.

In addition, there is an advantage in that it is possible to sense whether a touch is made in the center portion of the circular touch sensor. Furthermore, there is also the advantage of being able to distinguish between water droplet and touch.

In addition, there is an advantage of providing a routing method and a trace connection structure in a circular touch sensor.

DESCRIPTION OF DRAWINGS

FIG. 1 is a perspective view of an example of a conventional smartwatch.

FIG. 2 is a diagram illustrating a pattern structure of a touch sensor included in the smartwatch shown in FIG. 1.

FIG. 3 is a diagram illustrating an electrode pattern structure of the touch sensor 350 according to an embodiment of the present invention.

FIG. 4 is an auxiliary diagram illustrating an arrangement structure of a plurality of electrodes (TX0, . . . , TX7, RX0, . . . , RX7) included in the touch sensor 350 shown in FIG. 3.

FIG. 5 is a diagram illustrating an electrode pattern structure of the touch sensor 550 according to another embodiment of the present invention.

FIG. 6 is a diagram for explaining a problem that may occur in the touch sensor 350 shown in FIG. 3.

FIGS. 7 to 10 are diagrams for explaining routing of a plurality of electrodes included in the touch sensor according to an embodiment of the present invention shown in FIG. 5.

FIG. 11 is a diagram illustrating the number of traces of a touch sensor according to embodiments of the present invention.

FIG. 12 is a diagram illustrating another example of FIG. 9.

FIG. 13 is a diagram for explaining the number of routing and traces of the touch sensor according to FIG. 12.

FIG. 14 is a modified example of the touch sensor 350 shown in FIG. 3.

FIG. 15 is a modified example of the touch sensor 550 shown in FIG. 5.

FIGS. 16, 17A, and 17B are diagrams for explaining another routing and trace arrangement structure of the touch sensor 550 according to another embodiment of the present invention shown in FIG. 5.

FIG. 18A is a diagram illustrating an electrode pattern structure of a touch sensor 1850 according to another embodiment of the present invention.

FIGS. 18B and 18C are diagrams for explaining a routing and trace connection structure of the touch sensor 1850 shown in FIG. 18A.

FIG. 19 is a diagram illustrating an electrode pattern structure of a touch sensor 1950 according to another embodiment of the present invention.

FIG. 20 illustrates simulation environments for obtaining simulation results described in Table 2, reflecting YOCTA stack-up.

FIG. 21 is a simulation view that confirms the reference mutual capacitance value (Cm) in the untouched state of the touch sensor 550 illustrated in FIG. 5, the touch sensor 1850 illustrated in FIG. 18A, and the touch sensor 1950 illustrated in FIG. 19 to obtain the result of the simulation described in Table 2.

FIGS. 22A to 22C show actual simulation output data in the state of FIG. 21.

FIGS. 23A to 23C are graphs comparing how much Cm changes at points where mutual capacitance change (ΔCm) occurs at maximum (Max) and minimum (Min) in the touch sensor 550 illustrated in FIG. 5, the touch sensor 1850 illustrated in FIG. 18A, and the touch sensor 1950 illustrated in FIG. 19.

FIGS. 24A to 24C are output data simulating the self-capacitance (Cs) of the touch sensor 550 shown in FIG. 5, the touch sensor 1850 shown in FIG. 18A, and the touch sensor 1950 shown in FIG. 19, respectively.

FIG. 25 shows three simulations (Sim.1, Sim.2, Sim.3) performed with a 5-phi conductive rod for each of the touch sensors 550 illustrated in FIG. 5, the touch sensor 1850 illustrated in FIG. 18A, and the touch sensor 1950 illustrated in FIG. 19 to obtain the results of simulation1 (Sim.1), simulation2 (Sim.2), and simulation3 (Sim.3) described in Table 2.

FIG. 26 is a diagram simulating a maximum error (MAX error) and an RMS error (RMS error) when a straight-line touch of the left drawing of FIG. 25 is performed on each of the touch sensor 550 shown in FIG. 5, the touch sensor 1850 shown in FIG. 18A, and the touch sensor 1950 shown in FIG. 19.

FIG. 27 is a graph of a maximum error and an RMS error for each location (1, 2, 3, 4).

FIG. 28 is a diagram simulating the maximum error (Max error) and the RMS error (RMS error) when theta line touch in the middle drawing of FIG. 25 is performed on each of the touch sensor 550 shown in FIG. 5, the touch sensor 1850 shown in FIG. 18A, and the touch sensor 1950 shown in FIG. 19.

FIG. 29 is a graph of maximum error (Max error) and RMS error (RMS error) for each angle (1, 2, 3).

FIG. 30 is a diagram simulating a maximum error (Max error) and an RMS error (RMS error) when a wheel touch in the right drawing of FIG. 25 is performed on each of the touch sensor 550 shown in FIG. 5, the touch sensor 1850 shown in FIG. 18A, and the touch sensor 1950 shown in FIG. 19.

FIG. 31 is a graph of a maximum error (Max error) and an RMS error (RMS error) for each wheel position (1, 2).

FIG. 32 is a diagram illustrating an electrode pattern structure of the touch sensor 3250 according to another embodiment of the present invention.

FIG. 33 is a diagram illustrating a routing and trace connection structure of the touch sensor 3250 illustrated in FIG. 32.

FIG. 34 is a diagram illustrating an electrode pattern structure of a touch sensor 3450 according to another embodiment of the present invention.

FIG. 35 is a diagram illustrating a routing and trace connection structure of the touch sensor 3450 illustrated in FIG. 34.

MODE FOR INVENTION

The detailed description of the present invention to be described later refers to the accompanying drawings illustrating a specific embodiment in which the present invention may be implemented as an example. These embodiments will be described in detail sufficient for a person skilled in the art to implement the present invention. It should be understood that various embodiments of the present invention are different from each other but need not be mutually exclusive. For example, certain shapes, structures, and characteristics described herein may be implemented in other embodiments without departing from the spirit and scope of this invention in relation to one embodiment. It should also be understood that the location or arrangement of individual components within each disclosed embodiment may be changed without departing from the spirit and scope of the present invention. Accordingly, the detailed description set forth below is not intended to be taken in a limiting sense, and the scope of the present invention, if properly described, is limited only by the appended claims, along with all scope equivalents to those claimed. Similar reference numerals in the drawings refer to the same or similar functions throughout the various aspects.

Hereinafter, a touch sensor and a touch input device including the same according to an embodiment of the present invention will be described with reference to the accompanying drawings.

Here, a smartwatch is described as an example in describing a touch sensor and a touch input device including the same according to various embodiments of the present invention, but this is only an example. The technical idea or feature of the present invention may also be applied to a touch input device having a circular screen such as a smartwatch or having a circular shape, for example, an oval or rectangular touch screen. Hereinafter, it will be described in detail with reference to the drawings.

FIG. 3 is a diagram illustrating an electrode pattern structure of the touch sensor 350 according to an embodiment of the present invention.

Referring to FIG. 3, a touch sensor 350 according to an embodiment of the present invention has a circular structure and includes a plurality of electrodes (TX0, . . . , TX7, RX0, . . . , RX7) arranged in a single layer.

The plurality of electrodes (TX0, . . . , TX7, RX0, . . . , RX7) may be spaced apart from each other in a circle having a predetermined diameter. Here, the diameter of the circle may be approximately 35 mm A plurality of electrodes (TX0, . . . , TX7, RX0, . . . , RX7) arranged in the circle may be arranged in a predetermined arrangement.

The plurality of electrodes (TX0, TX7, RX0, RX7) include a plurality of first electrodes (TX0, TX1, TX2, TX3, TX4, TX5, TX6, TX7) and a plurality of second electrodes (RX0, RX1, RX2, RX3, RX4, RX5, RX6, RX7).

When the touch sensor 350 according to an embodiment of this invention is driven in the mutual sensing mode, a plurality of first electrodes (TX0, TX1, TX2, TX3, TX4, TX5, TX6, TX7) may be driving electrodes that output touch driving signals, and a plurality of second electrodes (RX0, RX1, RX2, RX3, RX4, RX5, RX6, RX7) may be receiving sensing signals. Here, on the contrary, the plurality of the first electrodes may be the receiving electrodes, and the plurality of the second electrodes may be the driving electrodes.

Meanwhile, when the touch sensor 350 according to an embodiment of the present invention is driven in a self-sensing mode, a plurality of electrodes (TX0, . . . , TX7, RX0, . . . , RX7) may output a touch driving signal and receive a detection signal.

A plurality of first electrodes (TX0, TX1, TX2, TX3, TX4, TX5, TX6, TX7) may be grouped into one group, and the touch sensor 350 may include a plurality of first electrodes (TX0, TX1, TX2, TX3, TX4, TX5, TX6, TX7). For example, the touch sensor 350 may include first electrodes of a first group, first electrodes of a second group, first electrodes of a third group, and first electrodes of a fourth group. The first electrodes (e.g., TX0) corresponding to each other in each group may be electrically connected through a trace.

The first electrodes (TX0, TX1, TX2, TX3, TX4, TX5, TX6, TX7) of the first group may be disposed to be spaced apart from each other in a circular shape in a central portion. Each of the first electrodes (TX0, TX1, TX2, TX3, TX4, TX5, TX6, TX7) may have a sectoral shape. Here, the sectoral shape includes not only a geometrically perfect sectoral shape, but also a shape resembling or similar to the sectoral shape. Accordingly, the shape of the plurality of first electrodes (TX0, TX1, TX2, TX3, TX4, TX5, TX6, TX7) arranged in a circle at the center portion is a perfect sector shape in FIG. 3. It should be also understood that a shape in which the central portion of the sector (or another sector having a smaller radius than the sector) is removed is also included in the sector. A top surface area (or cross-sectional area) of each of the first electrodes (TX0, TX1, TX2, TX3, TX4, TX5, TX6, TX7) of the first group may be the same as each other.

The first electrodes (TX0, TX1, TX2, TX3, TX4, TX5, TX6, TX7) of the second group are arranged to be spaced apart from each other in a ring shape or annular shape surrounding the first electrodes of the first group. The arrangement order may correspond to the arrangement order of the first electrodes of the first group. Each of the first electrodes (TX0, TX1, TX2, TX3, TX4, TX5, TX6, TX7) of the second group may have the same top surface area.

The first electrodes (TX0, TX1, TX2, TX3, TX4, TX5, TX6, TX7) of the third group are arranged to be spaced apart from each other in a ring shape or annular shape surrounding the first electrodes of the second group. The arrangement order may correspond to the arrangement order of the first electrodes of the second group. Each of the first electrodes (TX0, TX1, TX2, TX3, TX4, TX5, TX6, TX7) of the third group may have the same top surface area.

The first electrodes (TX0, TX1, TX2, TX3, TX4, TX5, TX6, TX7) of the fourth group are arranged to be spaced apart from each other in a ring shape or annular shape surrounding the first electrodes of the third group. The arrangement order may correspond to the arrangement order of the first electrodes of the third group. Each of the first electrodes (TX0, TX1, TX2, TX3, TX4, TX5, TX6, TX7) of the fourth group may have the same top surface area.

One or a plurality of second-0th electrodes (RX0) may be disposed between the first electrodes of the first group and the first electrodes of the second group. One or a plurality of second-0th electrodes (RX0) may have a ring shape or annular shape.

A plurality of second-1st electrodes (RX1), a plurality of second-2nd electrodes (RX2), and a plurality of second-3rd electrodes (RX3) may be disposed between the first electrodes of the second group and the first electrodes of the third group. The plurality of second-1st electrodes (RX1), the plurality of second-2nd electrodes (RX2), and the plurality of second-3rd electrodes (RX3) may be arranged spaced apart from each other in a ring shape or annular shape. The arrangement order may be that the order of the second-1st electrode (RX1), the second-2nd electrode (RX2), the second-3rd electrode (RX3), and the second-4th electrode (RX4) is repeated clockwise or counterclockwise direction. Here, the number of the plurality of second-1st electrodes (RX1) may be four, the number of second-2nd electrodes (RX2) may be eight, and the number of the plurality of second-3rd electrodes (RX3) may be four. The top surface areas of the second-1st electrode (RX1) and the second-3rd electrode (RX3) may be twice that of the second-2nd electrode (RX2). Here, the arrangement order may be the order in which the second-1st electrode (RX1), second-2nd electrode (RX2), and second-3rd electrode (RX3) are repeated clockwise or counterclockwise direction.

The second-1st electrode (RX1) may be disposed between two adjacent first electrodes (e.g., TX1 and TX2/TX3 and TX4/TX5 and TX6/TX7 and TX0) in the second group and two adjacent first electrodes (e.g., TX1 and TX2) in the third group. The second-3rd electrode (RX3) may be disposed between two adjacent first electrodes (e.g., TX2 and TX3) in the second group and two adjacent first electrodes (e.g., TX2 and TX3) in the third group.

A plurality of second-4th electrodes (RX4), a plurality of second-5th electrodes (RX5), a plurality of second-6th electrodes (RX6), and a plurality of second-7th electrodes (RX7) may be disposed between the first electrodes of the third group and the first electrodes of the fourth group. A plurality of second-4th electrodes (RX4), a plurality of second-5th electrodes (RX5), a plurality of second-6th electrodes (RX6), and a plurality of second-7th electrodes (RX7) may be arranged to be spaced apart from each other in a ring-shaped or annular shape. The arrangement order may be that the order of the second-4th electrode (RX4), the second-5th electrode (RX5), the second-6th electrode (RX6), the second-7th electrode (RX7), the second-6th electrode (RX6), and the second-5th electrode (RX5) is repeated clockwise or counterclockwise direction. Here, the number of the plurality of second-4th electrodes (RX4) may be four, the number of the plurality of second-5th electrodes (RX5) may be eight, and the number of the plurality of second-6th electrodes (RX6) may be eight, the number of the plurality of second-7 electrodes (RX7) may be four. The top surface areas of the second-4th electrode (RX4) and the second-7th electrode (RX7) may be twice that of the second-5th electrode (RX5) or the second-6th electrode (RX6). Here, the arrangement order may be an order in which the order of the second-4th electrode (RX4), the second-5th electrode (RX5), the second-6th electrode (RX6), and the second-7th electrode (RX7) are repeated clockwise or counterclockwise direction.

The second-4th electrode (RX4) may be disposed between two adjacent first electrodes (e.g., TX1 and TX2) in the third group and two adjacent first electrodes (e.g., TX1 and TX2) in the fourth group. The second-7th electrode (RX7) may be disposed between two adjacent first electrodes (e.g., TX2 and TX3) in the third group and two adjacent first electrodes (e.g., TX2 and TX3) in the fourth group.

Meanwhile, although not shown in the separate drawings, when the diameter of the touch sensor 350 increases, one or a plurality of groups of first electrodes may be added, and second electrodes may be arranged between the groups of the added first electrodes.

Hereinafter, an arrangement structure of the plurality of electrodes (TX0, TX7, RX0, RX7) included in the touch sensor 350 shown in FIG. 3 will be described in a different way using FIG. 4.

FIG. 4 is an auxiliary view for explaining an arrangement structure of a plurality of electrodes (TX0, TX7, RX0, RX7) included in the touch sensor 350 shown in FIG. 3.

The center (O) shown in FIG. 4 corresponds to the center of the touch sensor 350 shown in FIG. 3, and the first to seventh virtual circles (C1, . . . , C7) are concentric circles that have the center (O) in common. Here, the first virtual circle (C1) is defined as a concentric circle closest to the center (O), and the seventh virtual circle (C7) is defined as a concentric circle farthest from the center (O).

Referring to FIGS. 3 and 4, a plurality of electrodes (TX0, TX7, RX0, RX7) may be arranged on a plurality of concentric circles. More specifically, a plurality of electrodes (TX0, . . . , TX7, RX0, . . . , RX7) may be arranged on a plurality of virtual circles (C1, C2, C3, C4, C5, C6, C7) having the same center (O).

Referring to FIGS. 3 and 4, a plurality of first electrodes (TX0, TX1, TX2, TX3, TX4, TX5, TX6, TX7) may be arranged in each of the first, third, fifth, and seventh virtual circles (C1, C3, C5, C7). Hereinafter, it will be described in detail.

A plurality of the first electrodes (TX0, TX1, TX2, TX3, TX4, TX5, TX6, TX7) is arranged one by one on the first virtual circle (C1).

Each of the plurality of first electrodes (TX0, TX1, TX2, TX3, TX4, TX5, TX6, TX7) arranged on the first virtual circle (C1) may have a sectoral shape. Here, the sectoral shape includes not only a geometrically perfect sectoral shape, but also a shape resembling or similar to the sectoral shape. Accordingly, the shape of the plurality of the first electrodes (TX0, TX1, TX2, TX3, TX4, TX5, TX6, TX7) arranged on the first virtual circle (C1) is a perfect sector shape in FIG. 3. In addition, it should be also understood that a shape in which the central portion of the sector (or another sector having a smaller radius than the sector) is removed is also included in the sector.

The plurality of first electrodes (TX0, TX1, TX2, TX3, TX4, TX5, TX6, TX7) arranged on the first virtual circle (C1) may be arranged in the clockwise order of the first-0th electrode (TX0), the first-1st electrode (TX1), the first-2nd electrode (TX2), the first-3rd electrode (TX3), the first-4th electrode (TX4), the first-5th electrode (TX5), the first-6th electrode (TX6), and the first-7th electrode (TX7). Here, the arrangement order is an example, and the arrangement order may vary depending on the design.

A top surface area of each of the plurality of first electrodes (TX0, TX1, TX2, TX3, TX4, TX5, TX6, TX7) arranged on the first virtual circle (C1) may be the same as each other.

A plurality of the first electrodes (TX0, TX1, TX2, TX3, TX4, TX5, TX6, TX7) is arranged one by one on the third virtual circle (C3).

The plurality of the first electrodes (TX0, TX1, TX2, TX3, TX4, TX5, TX6, TX7) arranged on the third virtual circle (C3) may be arranged in a ring shape or annular shape. The plurality of the first electrodes (TX0, TX1, TX2, TX3, TX4, TX5, TX6, TX7) arranged on the third virtual circle (C3) can be divided into eight pieces of the same ring-shaped or annular shaped single pattern. Alternatively, the plurality of the first electrodes (TX0, TX1, TX2, TX3, TX4, TX5, TX6, TX7) arranged on the third virtual circle (C3) may have a shape in which each part of the sector (or another sector shape having a smaller radius than the sector above) is removed.

A top surface area of each of the plurality of first electrodes (TX0, TX1, TX2, TX3, TX4, TX5, TX6, TX7) arranged on the third virtual circle (C3) may be equal to each other. The arrangement positions of a plurality of first electrodes (TX0, TX1, TX2, TX3, TX4, TX5, TX6, TX7) arranged on the third virtual circle (C3) may correspond to the arrangement positions of a plurality of first electrodes (TX0, TX1, TX2, TX3, TX4, TX5, TX6, TX7) arranged on the first virtual circle (C1). Here, comparing the top surface areas of the first electrodes (e.g., TX0) arranged on the corresponding third virtual circle (C3) and the first electrodes (e.g., TX0) arranged on the first virtual circle (C1), the top surface areas of the first electrodes (e.g., TX0) arranged on the third virtual circle (C3) may be larger.

A plurality of first electrodes (TX0, TX1, TX2, TX3, TX4, TX5, TX6, TX7) is arranged one by one on the fifth virtual circle (C5).

A plurality of the first electrodes (TX0, TX1, TX2, TX3, TX4, TX5, TX6, TX7) arranged on the fifth virtual circle (C5) may be arranged in a ring shape or annular shape. The plurality of the first electrodes (TX0, TX1, TX2, TX3, TX4, TX5, TX6, TX7) arranged on the fifth virtual circle (C5) may be divided equally into eight pieces of the ring-shaped or annular shaped single pattern. Alternatively, the plurality of the first electrodes (TX0, TX1, TX2, TX3, TX4, TX5, TX6, TX7) arranged on the fifth virtual circle (C5) may have a shape in which each part of the sector (or another sector shape having a smaller radius than the sector above) is removed.

Each of the plurality of first electrodes (TX0, TX1, TX2, TX3, TX4, TX5, TX6, TX7) arranged on the fifth virtual circle (C5) may have the same top surface area. The arrangement positions of the plurality of first electrodes (TX0, TX1, TX2, TX3, TX4, TX5, TX6, TX7) arranged on the fifth virtual circle (C5) may correspond to the arrangement positions of the plurality of first electrodes (TX0, TX1, TX2, TX3, TX4, TX5, TX6, TX7) arranged on the third virtual circle (C3). Here, comparing the top surface areas of the first electrode (e.g., TX0) arranged on the corresponding fifth virtual circle (C5) and the first electrode (e.g., TX0) arranged on the third virtual circle (C3), the top surface area of the first electrode (e.g., TX0) arranged on the fifth virtual circle (C5) may be larger.

A plurality of first electrodes (TX0, TX1, TX2, TX3, TX4, TX5, TX6, TX7) is arranged one by one on the seventh virtual circle (C7).

The plurality of first electrodes (TX0, TX1, TX2, TX3, TX4, TX5, TX6, TX7) arranged on the seventh virtual circle (C7) may have a shape remaining after removing the vertex and arc portions of the sector shape. Alternatively, the plurality of first electrodes (TX0, TX1, TX2, TX3, TX4, TX5, TX6, TX7) arranged on the seventh virtual circle (C7) may be arranged in a ring shape or annular shape. The plurality of first electrodes (TX0, TX1, TX2, TX3, TX4, TX5, TX6, TX7) arranged on the seventh virtual circle (C7) may be a ring-shaped or annular single pattern divided equally into eight pieces.

A top surface area of each of the plurality of first electrodes (TX0, TX1, TX2, TX3, TX4, TX5, TX6, TX7) arranged on the seventh virtual circle (C7) may be the same. The arrangement positions of the plurality of first electrodes (TX0, TX1, TX2, TX3, TX4, TX5, TX6, TX7) arranged on the seventh virtual circle (C7) may correspond to the arrangement positions of the plurality of first electrodes (TX0, TX1, TX2, TX3, TX4, TX5, TX6, TX7) arranged on the fifth virtual circle (C5). Here, comparing the top surface areas of the first electrode (e.g., TX0) arranged on the corresponding seventh virtual circle (C7) and the first electrode (e.g., TX0) arranged on the fifth virtual circle (C5), the top surface area of the first electrode (e.g., TX0) arranged on the seventh virtual circle (C7) may be larger.

The sum of the top surface areas of the first-0th electrodes (TX0) positioned on the first, third, fifth, and seventh virtual circles (C1, C3, C5, C7), the sum of the top surface areas of the first-1st electrodes (TX1) positioned on the first, third, fifth, and seventh virtual circles (C1, C3, C5, C7), the sum of the top surface areas of the first-2nd electrodes (TX2) positioned on the first, third, fifth, and seventh virtual circles (C1, C3, C5, C7), the sum of the top surface areas of the first-3rd electrodes (TX3) positioned on the first, third, fifth, and seventh virtual circles (C1, C3, C5, C7), the sum of the top surface areas of the first-4th electrodes (TX4) positioned on the first, third, fifth, and seventh virtual circles (C1, C3, C5, C7), the sum of the top surface areas of the first-5th electrodes (TX5) positioned on the first, third, fifth, and seventh virtual circles (C1, C3, C5, C7), the sum of the top surface areas of the first-6th electrodes (TX6) positioned on the first, third, fifth, and seventh virtual circles (C1, C3, C5, C7), and the sum of the top surface areas of the first-7th electrodes (TX7) positioned on the first, third, fifth, and seventh virtual circles (C1, C3, C5, C7) may be equal to each other, and the sum of the top surface areas may be, for example, $19.17\pi mm^2$.

Meanwhile, referring again to FIGS. 3 and 4, a plurality of second electrodes (RX0, RX1, RX2, RX3, RX4, RX5, RX6, RX7) may be arranged on the second, fourth, and sixth virtual circles (C2, C4, C6). Here, the second virtual circle (C2) is disposed between the first virtual circle (C1) and the third virtual circle (C3), the fourth virtual circle (C4) is disposed between the third virtual circle (C3) and the fifth virtual circle (C5), and the sixth virtual circle (C6) is disposed between the fifth virtual circle (C5) and the seventh virtual circle (C7).

A plurality of second-0th electrodes (RX0) may be arranged on the second virtual circle (C2), a plurality of second-1st electrodes (RX1), a plurality of second-2nd electrodes (RX2), and a plurality of second-3rd electrodes (RX3) may be arranged on the fourth virtual circle (C4), and a plurality of second-4th electrodes (RX4), a plurality of second-5th electrodes (RX5), a plurality of second-6th electrodes (RX6), and a plurality of second-7th electrodes (RX7) may be arranged on the sixth virtual circle (C6).

The plurality of second-0th electrodes (RX0) arranged on the second virtual circle (C2) may be two second-0th electrodes (RX0). The two second-0th electrodes (RX0) may be arranged in a ring shape or an annular shape. The two second-0th electrodes (RX0) arranged on the second virtual circle (C2) may be a ring-shaped or annular shaped single pattern divided equally into two pieces. Here, the sum of the top surface areas of the two second-0th electrodes (RX0) may be 18.8 $\pi mm^2$.

Four second-1st electrodes (RX1), eight second-2nd electrodes (RX2), and four second-3rd electrodes (RX3) arranged on the fourth virtual circle (C4) are arranged in a ring shape or annular shape. Four second-1st electrodes (RX1), eight second-2nd electrodes (RX2), and four second-3rd electrodes (RX3) arranged on the fourth virtual circle (C4) may be divided into sixteen ring shaped or annular shaped single patterns. Here, the top surface area of one second-1st electrode (RX1) may be twice that of one second-2nd electrode (RX2). In addition, the top surface area of one second-3rd electrode (RX3) may be twice that of one second-2nd electrode (RX2).

Four second-1st electrodes (RX1), eight second-2nd electrodes (RX2), and four second-3rd electrodes (RX3) arranged on the fourth virtual circle (C4) may have a predetermined arrangement order. For example, the predetermined arrangement order may be that the order of the second-1 st electrode (RX1), the second-2nd electrode (RX2), the second-3rd electrode (RX3), and the second-2nd electrode (RX2) is repeated in a clockwise or counterclockwise direction.

The sum of top surface areas of four second-1st electrodes (RX1) arranged on the fourth virtual circle (C4), the sum of top surface areas of eight second-2nd electrodes (RX2), and the sum of top surface areas of four second-3rd electrodes (RX3) may be the same. For example, the sum of the top surface areas of the four second-1st electrodes (RX1), the sum of the top surface areas of the eight second-2nd electrodes (RX2), and the sum of the top surface areas of the four second-3rd electrodes (RX3) may be 19.4 $\pi mm^2$.

Meanwhile, the arrangement order of four second-1st electrodes (RX1), eight second-2nd electrodes (RX2), and four second-3rd electrodes (RX3) arranged on the fourth virtual circle (C4) may be different arrangement order.

Again, referring to FIG. 3, four second-4th electrodes (RX4), eight second-5th electrodes (RX5), eight second-6th electrodes (RX6), and four second-7th electrodes (RX7) arranged on the sixth virtual circle (C6) are arranged in a circular or ring shape. Four second-4th electrodes (RX4), eight second-5th electrodes (RX5), eight second-6th electrodes (RX6), and four second-7th electrodes (RX7) arranged on the sixth virtual circle (C6) may be divided into twenty-four ring-shaped or annular-shaped single patterns. Here, the top surface area of one second-4th electrode (RX4) may be twice that of one second-5th electrode (RX5) or one second-6th electrode (RX6). In addition, the top surface area of one second-7th electrode (RX7) may be twice that of one second-5th electrode (RX5) or one second-6th electrode (RX6).

Four second-4th electrodes (RX4), eight second-5th electrodes (RX5), eight second-6th electrodes (RX6), and four second-7th electrodes (RX7) arranged on the sixth virtual circle (C6) may have a predetermined arrangement order. For example, the predetermined arrangement order may be that the order of the second-4th electrode (RX4), the second-5th electrode (RX5), the second-6th electrode (RX6), the second-7th electrode (RX7), the second-6th electrode (RX6), and the second-5th electrode (RX5) are repeated in a clockwise or counterclockwise direction.

The sum of top surface areas of four second-4th electrodes (RX4) arranged on the sixth virtual circle (C6), the sum of top surface areas of eight second-5th electrodes (RX5), the sum of top surface areas of eight second-6th electrodes (RX6), and the sum of top surface areas of four second-7th electrodes (RX7) may be the same. For example, the sum of the top surface areas of the plurality of second-4th electrodes (RX4), the sum of the top surface areas of the plurality of second-5th electrodes (RX5), the sum of the top surface areas of the plurality of second-6th electrodes (RX6), and the sum of the top surface areas of the plurality of second-7th electrodes (RX7) may be 19.1 $\pi mm^2$.

Meanwhile, the arrangement order of four second-4th electrodes (RX4), eight second-5th electrodes (RX5), eight second-6th electrodes (RX6), and four second-7th electrodes (RX7) arranged on the sixth virtual circle (C6) may be in a different arrangement order.

Referring to FIG. 3, a second-0th electrode (RX0) is disposed between any one the first electrodes (e.g., TX0) of the plurality of first electrodes (TX0, TX1, TX2, TX3, TX4, TX5, TX6, TX7) on the first virtual circle (C1) and the first electrode (TX0) on the third virtual circle (C3) corresponding to any one first electrode (TX0).

Half of the second-1st electrode (RX1), the second-2nd electrode (RX2), and half of the second-3rd electrode (RX3) are disposed between the first electrode (TX0) on the third virtual circle (C3) and the first electrode (TX0) on the fifth virtual circle (C5) corresponding to the first electrode (TX0) on the third virtual circle (C3). Here, the other half of the second-1st electrode (RX1) is disposed between another adjacent first electrode (TX7) on the third virtual circle and another adjacent first electrode (TX7) on the fifth virtual circle (C5). In addition, the other half of the second-3rd electrode (RX3) is disposed between another adjacent first electrode (TX1) on the third virtual circle and another adjacent first electrode (TX1) on the fifth virtual circle (C5).

Half of the second-4th electrode (RX4), the second-5th electrode (RX5), the second-6th electrode (RX6), and half of the second-7th electrode (RX7) are disposed between the first electrode (TX0) on the fifth virtual circle (C5) and the first electrode (TX0) on the seventh virtual circle (C7) corresponding to the first electrode (TX0) on the fifth virtual circle (C5). Here, the other half of the second-4th electrode (RX4) is disposed between the other adjacent first electrode (TX7) on the fifth virtual circle (C5) and the other adjacent first electrode (TX7) on the seventh virtual circle (C7). In addition, the other half of the second-7th electrode (RX7) is disposed between another adjacent first electrode (TX1) on the fifth virtual circle (C5) and another adjacent first electrode (TX1) on the seventh virtual circle (C7).

Meanwhile, referring to the lower right drawing of FIG. 3, when the diameter of the touch sensor 350 is 35 mm, the radius is 17.5 mm, and the length from the center to the first electrode on the first virtual circle (C1) is 2.5 mm, the length from the center to the second-0th electrode (RX0) on the second virtual circle (C2) is 5.1 mm, the length from the center to the first electrode on the third virtual circle (C3) is 7.5 mm, the length from the center to the second electrode on the fourth virtual circle (C4) is 10.7, the length from the center to the first electrode on the fifth virtual circle (C5) is 12.8 mm, and the length from the center to the second electrode on the sixth virtual circle (C6) is 15.5 mm, and the length from the center to the first electrode on the seventh virtual circle (C7) may be 17.5 mm Here, the distance between the first electrode and the second electrode may be changed according to actual routing.

As described above, the touch sensor 350 according to an embodiment of the present invention shown in FIG. 3 may include eight the plurality of first electrodes (TX0, TX1, TX2, TX3, TX4, TX5, TX6, TX7), and eight the plurality of second electrodes (RX0, RX1, RX2, RX3, RX4, RX5, RX6, and RX7) also. Therefore, the total number of channels is 8+8, so a total of sixteen channels may be configured.

In addition, since the number of receiving channels (RX channel) is an even number of eight, there is an advantage in that differential sensing is possible.

In addition, since the top surface area of each channel is uniform, a self capacitance change value (self cap) is uniformly generated when a plurality of electrodes are driven in the self-sensing mode.

In addition, since the top surface area of each channel is uniform, mutual capacitance change values (mutual caps, Cm) output from the receiving electrodes are uniformly generated when the plurality of electrodes are driven in the mutual sensing mode. It may have a Cm value of approximately 200 pF or less.

In addition, in the conventional touch sensor with an orthogonal pattern structure shown in FIG. 2, the SNR of touch sensing during wheel touch is lowered, making it difficult to recognize touch coordinates. However, since the touch sensor shown in FIG. 3 has a plurality of electrodes arranged along the shape of the edge portion, the SNR of the touch sensing can be improved, and thus the touch coordinate recognition can be clearly identified.

In addition, the touch sensor shown in FIG. 3 has the advantage of being implemented in a full node (Full node) method in which the first electrodes are respectively disposed on both sides with respect to one second electrode.

In addition, the total number of traces may be configured to thirty-seven through a predetermined routing method. A description of the routing method and the total number of traces will be described later with reference to FIGS. 7 to 10.

FIG. 5 is a view for explaining the electrode pattern structure of the touch sensor 550 according to another embodiment of the present invention.

The touch sensor 550 according to another embodiment of the present invention shown in FIG. 5 is different from the touch sensor 350 according to the embodiment of the present invention shown in FIG. 3 only in that the second-0th electrode (RX0) is added to the center. Accordingly, matters except for the following description are the same as those shown in FIG. 3 or 4. Hereinafter, parts different from those of FIG. 3 will be mainly described.

Referring to FIG. 5, in the touch sensor 550 according to another embodiment of the present invention, the second-0th electrode (RX0) is disposed on the center portion, and the first electrodes (TX0, TX1, TX2, TX3, TX4, TX5, TX6, TX7) of the first group described in FIG. 3 are arranged to surround the second-0th electrode (RX0).

Alternatively, in the touch sensor 550 according to another embodiment of the present invention shown in FIG. 5, the second-0th electrode (RX0) is additionally disposed on the touch sensor 350 illustrated in FIG. 3, and the second-0th electrode (RX0) may be disposed on the center (O) illustrated in FIG. 4.

The touch sensor 550 according to another embodiment of the present invention shown in FIG. 5 may solve the following problems that may occur in the touch sensor 350 shown in FIG. 3. It will be described with reference to FIG. 6.

FIG. 6 is a diagram for explaining a problem that may occur in the touch sensor 350 shown in FIG. 3. Specifically, FIG. 6 is a diagram illustrating a case in which a predetermined test conductive rod T is moved on the touch sensor 350 illustrated in FIG. 3. The left drawing is a drawing in which the test conductive rod (T) is located on an arbitrary position of the touch sensor 350, and the right drawing is a drawing in which the test conductive rod (T) is located on the center of the touch sensor 350. Here, the test conductive rod (T) may have a diameter of approximately 5 phi and may be made of a conductive material.

From the left drawing of FIG. 6 to the right drawing, when the test conductive rod (T) is positioned to cover the center of the touch sensor 350 or the first electrodes of the first group or the first electrodes on the first virtual circle in the touch sensor 350, a problem occurs in that the detection signal output from the touch sensor 350 disappears. This may occur when the touch sensor 350 drives in a self-sensing mode and senses a sensing signal using differential sensing.

Here, the differential sensing is a method of sensing whether or not a touch occurs using signals obtained by subtracting sensing signals output from two of the plurality of first electrodes (TX0, TX1, TX2, TX3, TX4, TX5, TX6, TX7). For example, when the touch sensor 350 is driven in the self-sensing mode, the touch driving IC (or control unit) of the touch input device may receive a signal obtained by subtracting two sensing signals output from the first-0th electrode (TX0) and the first-1st electrode (TX1) to determine whether a touch is made.

As shown in the right diagram of FIG. 6, while the test conductive rod (T) is touched by the touch sensor 350 to cover the first electrodes of the first group or the first electrodes on the first virtual source, when the touch sensor 350 shown in FIG. 3 is driven in the self-sensing mode, a predetermined sensing signal is output from each of the first electrodes of the first group. If two sensing signals output from TX0 and TX1 are subtracted, it is 0. If two sensing signals output from TX2 and TX3 are subtracted, it is 0. If two sensing signals output from TX4 and TX5 are subtracted, it is 0. If two sensing signals output from TX6 and TX7 are subtracted, it is 0. Therefore, the sensing signal input to the actual touch driving IC (or the control unit) becomes 0. Accordingly, although the test conductive rod (T) is located in the center of the touch sensor 350, the touch input device can not sense any touch.

However, the touch sensor 550 according to another embodiment of this invention illustrated in FIG. 5 further includes a circular second-0th electrode (RO) with a predetermined diameter in the center. Therefore, when the test conductive rod (T) touches the center portion of the touch sensor 550 shown in FIG. 5 as shown in the left diagram of FIG. 6, whether the test conductive rod (T) is touched may be sensed by reinforcing the sensing signal output from the second-0th electrode (RO).

Furthermore, the touch sensor 550 shown in FIG. 5 may distinguish between a touch and a droplet at the center portion by the second-0th electrode (RX0) disposed at the center portion, but the touch sensor 350 shown in FIG. 3 may not distinguish a droplet as well as a touch at the center portion.

In addition, the touch sensor 550 according to another embodiment of the present invention shown in FIG. 5 may include eight the plurality of first electrodes (TX0, TX1, TX2, TX3, TX4, TX5, TX6, TX7) and eight the plurality of second electrodes (RX0, RX1, RX2, RX3, RX4, RX5, RX6, RX7). Therefore, the total number of channels is 8+8, so a total of sixteen channels may be configured.

In addition, since the number of receiving channels (RX channels) is 8, which is an even number, there is an advantage in that differential sensing is possible.

In addition, since the top surface area of each channel is uniform, there is an advantage that the self-capacitance change value (self cap) is uniformly generated when a plurality of electrodes is driven in the self-sensing mode.

In addition, since the top surface area of each channel is uniform, there is an advantage that the mutual capacitance change value (mutual cap, Cm) output from the receiving electrode is uniformly generated when the plurality of electrodes is driven in the mutual sensing mode. Here, for example, it may have a Cm value of approximately 200 pF or less.

In addition, in the conventional touch sensor with an orthogonal pattern structure shown in FIG. 2, the SNR of touch sensing during wheel touch is lowered, making it difficult to recognize touch coordinates. However, since the touch sensor shown in FIG. 5 has a plurality of electrodes arranged along the shape of the edge portion, the SNR of the touch sensing can be improved, and thus the touch coordinate recognition can be clearly identified.

In addition, the touch sensor shown in FIG. 5 is implemented in a full node (Full node) method in which the first electrodes are respectively disposed on both sides of one second electrode, except for the second-0th electrode (RX0) disposed in the center portion. Accordingly, the touch sensor shown in FIG. 5 is almost a full node method.

In addition, the total number of traces may be configured to thirty-seven through a predetermined routing method. A description of the routing method and the total number of traces will be described later with reference to FIGS. 7 to 10.

Meanwhile, referring to the lower right drawing of FIG. 5, when the diameter of the touch sensor 550 is 35 mm, the radius is 17.5 mm. The length from the center to the second-0th electrode (RX0) located at the center may be 0.1 mm, and the length from the center to the first electrode on the first virtual circle (C1) may be 2.5 mm. The length from the center to the second-0th electrode (RX0) on the second virtual circle (C2) may be 4.9 mm, and the length from the center to the first electrode on the third virtual circle (C3) may be 7.5 mm. The length from the center to the second electrode on the fourth virtual circle (C4) may be 10.7, and the length from the center to the first electrode on the fifth virtual circle (C5) may be 12.8 mm. The length from the center to the second electrode on the sixth virtual circle (C6) may be 15.5 mm, and the length from the center to the first electrode on the seventh virtual circle (C7) may be 17.5 mm Here, the distance between the first electrode and the second electrode may be changed according to actual routing.

FIGS. 7 to 10 are diagrams for explaining routing of a plurality of electrodes included in the touch sensor according to an embodiment of the present invention shown in FIG. 5.

FIGS. 7 to 8 are diagrams for describing a routing and trace connection structure of a plurality of first electrodes (TX0, TX1, TX2, TX3, TX4, TX5, TX6, TX7) shown in FIG. 5.

FIG. 7 is a diagram for explaining routing and trace connection structure of the first-0th electrode (TX0), the first-1st electrode (TX1), the first-6th electrode (TX6), and the first-7th electrode (TX7). FIG. 8 is a diagram for explaining the routing and trace connection structure of the first-2nd electrode (TX2), the first-3rd electrode (TX3), the first-4th electrode (TX4), and the first-5th electrode (TX5). Here, the matters shown in FIGS. 7 and 8 may be applied to the touch sensor 350 according to an embodiment of the present invention shown in FIG. 3.

First, referring to FIG. 7, traces of the first-0th electrode (TX0), the first-1 st electrode (TX1), the first-6th electrode (TX6), and the first-7th electrode (TX7) may be disposed on one side (left side) of the touch sensor 550.

Specifically, the first-0th electrodes (TX0) disposed on the first, third, fifth, and seventh virtual circles (C1, C3, C5, C7) are electrically connected to the trace (a). Also, the first-7th electrodes (TX7) disposed on the first, third, fifth, and seventh virtual circles (C1, C3, C5, C7) are electrically connected to the trace (h). For reference, in FIG. 7, for convenience of description, a trace (a) connected to the first-0th electrodes (TX0) disposed on the 1, 3, 5, 7 virtual circles (C1, C3, C5, C7) and a trace (h) connected to the first-7th electrode (TX7) disposed on the 1, 3, 5, 7 virtual circles (C1, C3, C5, C7) are indicated by a thick line.

The trace (a) is connected to the first-0th electrode (TX0) as it passes between the first-0th electrode (TX0) and the first-7th electrode (TX7) on the seventh virtual circle (C7). Then, it passes between the second-4th electrode (RX4) and the second-5th electrode (RX5) on the sixth virtual circle (C6). Then, while passing between the first-0th electrode (TX0) and the first-7th electrode (TX7) on the fifth virtual circle (C5), it is connected to the first-0th electrode (TX0). And it passes between the second-1 st electrode (RX1) and the second-2nd electrode (RX2) on the fourth virtual circle (C4). Then, it passes between the first-0th electrode (TX0) and the first-7th electrode (TX7) on the third virtual circle (C3) and is connected to the first-0th electrode (TX0). Further, it passes between two second-0th electrodes (RX0) on the second virtual circle (C2) and is connected to the first-0th electrode (TX0) on the first virtual circle (C1).

The trace (h) is connected to the first-7th electrode (TX7) as it passes between the first-0th electrode (TX0) and the first-7th electrode (TX7) on the seventh virtual circle (C7). Then, it passes between the second-4th electrode (RX4) and the second-5th electrode (RX5) on the sixth virtual circle (C6). Then, while passing between the first-0th electrode (TX0) and the first-7th electrode (TX7) on the fifth virtual circle (C5), it is connected to the first-7th electrode (TX7). And it passes between the second-1 st electrode (RX1) and the second-2nd electrode (RX2) on the fourth virtual circle (C4). Then, it passes between the first-0th electrode (TX0) and the first-7th electrode (TX7) on the third virtual circle (C3) and is connected to the first-7th electrode (TX7). Further, it passes between two second-0th electrodes (RX0) on the second virtual circle (C2) and is connected to the first-7th electrode (TX7) on the first virtual circle (C1).

The first-1st electrodes (TX1) positioned on the first, third, fifth, and seventh virtual circles (C1, C3, C5, C7) are electrically connected to the trace (b). Specifically, trace (b) is connected to the first-1st electrode (TX1) as it passes between the first-0th electrode (TX0) and the first-1st electrode (TX1) on the seventh virtual circle (C7). Then, it passes between the second-4th electrode (RX4) and the second-5th electrode (RX5) on the sixth virtual circle (C6). Further, it is connected to the first-1st electrode (TX1) as it passes between the first-0th electrode (TX0) and the first-1st electrode (TX1) on the fifth virtual circle (C5). And it passes between the second-1st electrode (RX1) and the second-2nd electrode (RX2) on the fourth virtual circle (C4). Then, it passes between the first-0th electrode (TX0) and the first-1st electrode (TX1) on the third virtual circle (C3) and is connected to the first-1st electrode (TX1). Further, it passes between two second-0th electrodes (RX0) on the second virtual circle (C2) and is connected to the first-1st electrode (TX1) on the first virtual circle (C1).

The first-6th electrodes (TX6) disposed on the first, third, fifth, and seventh virtual circles (C1, C3, C5, C7) are electrically connected to the trace (e). Specifically, the trace (e) is connected to the first-6th electrode (TX6) as it passes between the first-7th electrode (TX7) and the first-6th electrode (TX6) on the seventh virtual circle (C7). Then, it passes between the second-4th electrode (RX4) and the second-5th electrode (RX5) on the sixth virtual circle (C6). Further, it is connected to the first-6th electrode (TX6) as it passes between the first-7th electrode (TX7) and the first-6th electrode (TX6) on the fifth virtual circle (C5). And it passes between the second-1st electrode (RX1) and the second-2nd electrode (RX2) on the fourth virtual circle (C4). Then, it passes between the first-7th electrode (TX7) and the first-6th electrode (TX6) on the third virtual circle (C3) and is connected to the first-6th electrode (TX6). Further, it passes between two second-0th electrodes (RX0) on the second virtual circle (C2) and is connected to the first-6th electrode (TX6) on the first virtual circle (C1).

Referring to FIG. 8, traces of the first-2nd electrode (TX2), the first-3rd electrode (TX3), the first-4th electrode (TX4), and the first-5th electrode (TX5) may be disposed on the other side (right side) of the touch sensor 550.

Specifically, the first-3rd electrodes (TX3) disposed on the 1, 3, 5, and 7 virtual circles (C1, C3, C5, C7) are electrically connected to the trace (d), and the first-4th electrodes (TX4) disposed on the 1, 3, 5, and 7 virtual circles (C1, C3, C5, C7) are electrically connected to the trace (e). For reference, in FIG. 8, for convenience of description, a trace (d) connected to the first-3rd electrodes (TX3) disposed on the first, third, fifth, and seventh virtual circles (C1, C3, C5, C7) and a trace (e) connected to the first-4th electrodes (TX4) disposed on the first, third, fifth, and seventh virtual circles (C1, C3, C5, C7) are indicated by a thick line.

The trace (d) is connected to the first-3rd electrode (TX0) while passing between the first-3rd electrode (TX3) and the first-4th electrode (TX4) on the seventh virtual circle (C7). Then, it passes between the second-4th electrode (RX4) and the second-5th electrode (RX5) on the sixth virtual circle (C6). Further, it is connected to the first-3rd electrode (TX3) as it passes between the first-3rd electrode (TX3) and the first-4th electrode (TX4) on the fifth virtual circle (C5). And it passes between the second-1st electrode (RX1) and the second-2nd electrode (RX2) on the fourth virtual circle (C4). Then, it is connected to the first-3rd electrode (TX3) by passing between the first-3rd electrode (TX3) and the first-4th electrode (TX4) on the third virtual circle (C3). Further, it passes between two second-0th electrodes (RX0) on the second virtual circle (C2) and is connected to the first-3rd electrode (TX3) on the first virtual circle (C1).

The trace (e) is connected to the first-4th electrode (TX4) as it passes between the first-3rd electrode (TX3) and the first-4th electrode (TX4) on the seventh virtual circle (C7). Then, it passes between the second-4th electrode (RX4) and the second-5th electrode (RX5) on the sixth virtual circle (C6). Further, it is connected to the first-4th electrode (TX4) as it passes between the first-3rd electrode (TX3) and the first-4th electrode (TX4) on the fifth virtual circle (C5). And it passes between the second-first electrode (RX1) and the second-2nd electrode (RX2) on the fourth virtual circle (C4). Then, it is connected to the first-4th electrode (TX4) as it passes between the first-3rd electrode (TX3) and the first-4th electrode (TX4) on the third virtual circle (C3). Further, it passes between two second-0th electrodes (RX0) on the second virtual circle (C2) and is connected to the first-4th electrode (TX4) on the first virtual circle (C1).

The first-2nd electrodes (TX2) disposed on the first, third, fifth, and seventh virtual circles (C1, C3, C5, C7) are electrically connected to the trace (c). Specifically, the trace (c) is connected to the first-2nd electrode (TX2) as it passes between the first-2nd electrode (TX2) and the first-3rd electrode (TX3) on the seventh virtual circle (C7). Then, it passes between the second-4th electrode (RX4) and the second-5th electrode (RX5) on the sixth virtual circle (C6). Further, it is connected to the first-2nd electrode (TX2) as it passes between the first-2nd electrode (TX2) and the first-3rd electrode (TX3) on the fifth virtual circle (C5). And it passes between the second-1st electrode (RX1) and the second-2nd electrode (RX2) on the fourth virtual circle (C4). Then, it is connected to the first-2nd electrode (TX2) as it passes between the first-2nd electrode (TX2) and the first-3rd electrode (TX3) on the third virtual circle (C3). Further, it passes between two second-0th electrodes (RX0) on the second virtual circle (C2) and is connected to the first-2nd electrode (TX2) on the first virtual circle (C1).

The first-5th electrodes (TX5) disposed on the first, third, fifth, and seventh virtual circles (C1, C3, C5, C7) are electrically connected to the trace (f). Specifically, the trace (f) is connected to the first-5th electrode (TX5) as it passes between the first-4th electrode (TX4) and the first-5th electrode (TX5) on the seventh virtual circle (C7). Then, it passes between the second-4th electrode (RX4) and the second-5th electrode (RX5) on the sixth virtual circle (C6). Further, it is connected to the first-5th electrode (TX5) as it passes between the first-4th electrode (TX4) and the first-5th electrode (TX5) on the fifth virtual circle (C5). And it passes between the second-1st electrode (RX1) and the second-2nd electrode (RX2) on the fourth virtual circle (C4). Then, it is connected to the first-5th electrode (TX5) as it passes between the first-4th electrode (TX4) and the first-5th electrode (TX5) on the third virtual source (C3). Further, it passes between two second-0th electrodes (RX0) on the second virtual circle (C2) and is connected to the first-5th electrode (TX5) on the first virtual circle (C1).

FIGS. 9 to 10 are diagrams for explaining a routing and trace connection structure of a plurality of second electrodes (RX0, RX1, RX2, RX3, RX4, RX5, RX6, RX7) shown in FIG. 5. FIG. 9 is a diagram for explaining the routing and trace connection structure of the plurality of second electrodes (RX0 to RX7) disposed on the first to seventh virtual circles (C1, . . . , C7). FIG. 10 is a diagram for explaining the routing structure of the second-1st electrode (RX1), the second-2nd electrode (RX2), and the second-3rd electrode (RX3) on the fourth virtual circle (C4), and a routing structure of the second-4th electrode (RX4), the second-5th electrode (RX5), the second-6th electrode (RX6), and the second-7th electrode (RX7) on the sixth virtual circle (C6). Here, the matters illustrated in FIGS. 9 to 10 may be applied to the touch sensor 350 according to an embodiment of the present invention illustrated in FIG. 3.

Referring to FIG. 9, the trace ⓐ is electrically connected to two second-0th electrodes (RX0) on the second virtual circle (C2) and the second-0th electrode (RX0) disposed on the center. Trace ⓐ is located along with traces (a) and (h) described in FIG. 7 on the seventh, sixth, fifth, fourth, third, and second virtual circles (C7, C6, C5, C4, C3, C2). Then, it is connected to two second-0th electrodes (RX0) on the second virtual circle (C2). Further, it passes between the first-0th electrode (TX0) and the first-7th electrode (TX7) on a first virtual circle (not shown) and is connected to the second-0th electrode (RX0) disposed on the center. Here, in the case of the touch sensor 350 shown in FIG. 3, the trace ⓐ ends up being connected to two second-0th electrodes (RX0) on the second virtual circle (C2).

Referring to FIG. 10, the trace ⓑ is connected to any one second-1st electrodes (RX1) of two second-1 st electrodes (RX1) connected in series with each other on the fourth virtual circle (C4).

The trace ⓒ is connected to any one second-2nd electrode (RX2) of four second-2nd electrodes (RX2) connected to each other in series on the fourth virtual circle (C4).

The trace ⓓ is connected to any one second-3rd electrode (RX3) of two second-3rd electrodes (RX3) connected to each other in series on the fourth virtual circle (C4).

Referring to FIG. 9, three traces ⓑⓒⓓ are disposed together to reach the fourth virtual circle (C4). Specifically, the three traces ⓑⓒⓓ pass between the first-6th electrode (TX6) and the first-7th electrode (TX7) on the seventh virtual circle (C7), between the second-4th electrode (RX4) and the second-5th electrode (RX5) on the sixth virtual circle (C6), and between the first-6th electrode (TX6) and the first-7th electrode (TX7) on the fifth virtual circle (C5), Then the three traces ⓑⓒⓓ are connected to any one of the second-1st electrodes (RX1), any one of the second-2nd electrodes (RX2), and any one of the second-3rd electrodes (RX3) on the fourth virtual circle (C4), respectively.

Referring again to FIG. 10, the trace ⓔ is connected to any one of the two second-4th electrodes (RX4) connected to each other in series on the sixth virtual circle (C6).

The trace ⓕ is connected to any one of the four second-5th electrodes (RX5) connected in series with each other on the sixth virtual circle (C6).

The trace ⓖ is connected to any one of the four second-6th electrodes (RX6) connected to each other in series on the sixth virtual circle (C6).

Then, the trace ⓗ is connected in parallel to two second-7th electrodes (RX7) on the sixth virtual circle (C6).

Referring to FIG. 9, three traces ⓔⓕⓖ are disposed together to reach the sixth virtual circle (C6). Specifically, the three traces ⓔⓕⓖ pass between the first-4th electrode (TX4) and the first-5th electrode (TX5) on the seventh virtual circle (C7). Then it is connected to any one of the second-4th electrodes (RX4), any one of the second-5th electrodes (RX5), and any one of the second-6th electrodes (RX6) on the sixth virtual circle (C6), respectively. In addition, the trace ⓗ passes between the first-5th electrode (TX5) and the first-6th electrode (TX6) on the seventh virtual circle (C7) and is connected in parallel to the two second-7th electrodes (RX7) on the sixth virtual circle (C6).

Meanwhile, although not shown in FIG. 9, three traces ⓑⓒⓓ and three traces ⓔⓕⓖ may be disposed in the semicircular portion omitted in FIG. 9.

FIG. 11 is a diagram for explaining the number of traces (trace) of a touch sensor according to the embodiments of the present invention. Here, left traces in FIG. 11 include the traces of FIGS. 7 and 10, and right traces include the traces of FIGS. 8 and 10.

Referring to FIG. 11, according to the routing method shown in FIGS. 7 to 10, twenty traces may be disposed on one side of the touch sensors 350 and 550, and seventeen traces may be disposed on the other side of the touch sensors 350 and 550.

Specifically, twenty traces disposed on one side of the touch sensor 350 and 550 may configure two traces for ESD on each side, four traces for TX0, TX1, TX6, TX7, eight traces for RX0 to RX7, and six traces for a guard (GUARD) to prevent electrical contact between TX and RX.

The seventeen traces disposed on the other side of the touch sensor 350 and 550 may configure two traces for ESD on each side, four traces for TX2, TX3, TX4, TX5, seven traces for RX1 to RX7, and four traces for a guard (GUARD) to prevent electrical contact between TX and RX.

As described above, the touch sensors 350 and 550 shown in FIG. 3 or 5 may be configured with a total of thirty-seven traces, and twenty-three active traces may be configured among these traces. Here, the active trace means the number of traces connected to TXs and RXs, excluding ten traces for guards and four ESD traces in the total number of traces.

FIG. 12 is a diagram showing another example of FIG. 9, and FIGS. 13 (A) and (B) are diagrams for explaining routing and the number of traces of the touch sensor shown in FIG. 12.

In the touch sensor according to another example illustrated in FIG. 12, the position of a trace ⓔⓕⓖ is different from the position of the trace ⓔⓕⓖ in FIG. 9. Specifically, the trace ⓔⓕⓖ is placed with the trace ⓗ.

Referring to FIGS. 12 and 13(A), the trace ⓔ is connected to any one of two second-4th electrodes (RX4) connected in series to each other on the sixth virtual circle (C6).

Trace ⓕ is connected to any one of the second-5th electrodes (RX5) among the four second-5th electrodes (RX5) connected in series to each other on the sixth virtual circle (C6).

Trace ⓖ is connected to any one of the second-6th electrodes (RX6) among the four second-6th electrodes (RX6) connected in series with each other on the sixth virtual circle (C6).

Then, the trace ⓗ is connected in parallel to two second-7th electrodes (RX7) on the sixth virtual circle (C6).

Referring to FIG. 12, four traces ⓔⓕⓖⓗ are disposed together to reach the sixth virtual circle (C6). Specifically, the four traces ⓔⓕⓖⓗ pass between the first-5th electrode (TX5) and the first-6th electrode (TX6) on the seventh virtual circle (C7) and are connected to any one of the second-4th electrodes (RX4), any one of the second-5th electrodes (RX5), any one of the second-6th electrodes (RX6), and any two of the second-7th electrodes (RX7) on the sixth virtual circle (C6).

Meanwhile, although not shown in FIG. 12, three traces MO and four traces may be disposed in the same manner for the semicircular portion omitted in FIG. 12.

Referring to (B) of FIG. 13, twenty-one traces may be disposed on one side of the touch sensor shown in FIG. 12, and eighteen traces may be disposed on the other side of the touch sensor.

Specifically, twenty-one traces disposed on one side of the touch sensor shown in FIG. 12 may include two traces for ESD on both sides, four traces for TX0, TX1, TX6, and TX7, eight traces for RX0 to RX7, and seven guard (GUARD) traces for preventing electrical contact between TX and RX.

The eighteen traces disposed on the other side of the touch sensor shown in FIG. 12 may include two traces for ESD on both sides, four traces for TX2, TX3, TX4, and TX5, seven traces for RX1 to RX7, and five guard (GUARD) traces to prevent electrical contact between TX and RX.

As described above, the touch sensor shown in FIG. 12 may be configured with a total of thirty-nine traces, and twenty-three active traces among these traces may be configured. Here, the active trace means the number of traces connected to TXs and RXs excluding twelve guard traces and four ESD traces from the total number of traces.

FIG. 13 is a modified example of the touch sensor 350 illustrated in FIG. 3.

The touch sensor 350' shown in FIG. 13 differs from the touch sensor 350 shown in FIG. 3 in that a plurality of first electrodes are RX0, RX1, RX2, RX3, RX4, RX5, RX6, RX7, and a plurality of second electrodes are configured with TX0, TX1, TX2, TX3, TX4, TX5, TX6, TX7.

The touch sensor 350' shown in FIG. 13 also has the same technical effect as the touch sensor 350 shown in FIG. 3 and the number of routing and traces may be configured the same.

FIG. 14 is a modified example of the touch sensor 550 illustrated in FIG. 5.

The touch sensor 550' shown in FIG. 14 differs from the touch sensor 550 shown in FIG. in that a plurality of first electrodes are RX0, RX1, RX2, RX3, RX4, RX5, RX6, RX7, and a plurality of second electrodes are configured with TX0, TX1, TX2, TX3, TX4, TX5, TX6, TX7.

The touch sensor 550' shown in FIG. 14 also has the same technical effect as the touch sensor 550 shown in FIG. 5, and the number of routing and traces may be configured the same.

Table 1 below compares the characteristics of the conventional touch sensor shown in FIG. 2, the touch sensor according to an embodiment of the present invention shown in FIG. 3, and the touch sensor according to another embodiment of the present invention shown in FIG.

FIGS. 16, 17A, and 17B are diagrams for explaining another routing and trace arrangement structure of the touch sensor 550 according to another embodiment of the present invention shown in FIG. 5.

Referring to FIGS. 16, 17A, and 17B, the number of traces of the touch sensor 550 of FIG. 5 may be forty-three. The number of traces of the touch sensor 550 of FIG. 5 is slightly increased than the number of traces of the touch sensor of FIGS. 3, 5, and 12. However, the overall number of traces passing between the electrode (or pattern) and the electrode (or pattern) may be reduced, and when considering the performance of the touch sensor, there is an advantage in that the capacitance change (delta Cm) is formed larger. In addition, since the bundles (A and B) of traces can be reduced to two, there is an advantage in that trace management is easy.

Referring to the virtual circle of FIG. 4, the second-1st electrodes (RX1), the second-2nd electrodes (RX2), and the second-3rd electrodes (RX3) disposed on the fourth virtual circle (C4) are divided into two groups (first group and second group). Each group includes RX2-RX3-RX2-RX1-RX2-RX3-RX2-RX1 sequentially arranged clockwise on the fourth virtual circle (C4). The second-1st electrodes (RX1) of each group are connected in series, the second-2nd electrodes (RX2) are also connected in series, and the second-3rd electrodes (RX3) are also connected in series.

A trace connected to any one second-1st electrode (RX1) in the first group, a trace connected to one second-2nd electrode (RX2), and a trace connected to one second-3rd electrode (RX3) pass between the first-6th electrode (TX6) and first-7th electrode (TX7) on the fifth virtual circle (C5). Then, it passes between the second-5th electrode (RX5) and the second-6th electrode (RX6) on the 6th virtual circle C6 (C6). Then, it is included in the trace bundle (A) after passing between the first-6th electrode (TX6) and the first-7th electrode (TX7) on the seventh virtual circle (C7).

A trace connected to any one second-1st electrode (RX1) in the second group, a trace connected to one second-2nd electrode (RX2), and a trace connected to one second-3rd electrode (RX3) pass between the first-3rd electrode (TX3)

TABLE 1

| | | Touch sensor in FIG. 2 | Touch sensor in FIG. 3 | Touch sensor in FIG. 5 |
|---|---|---|---|---|
| | Diameter[mm] | 35 | 35 | 35 |
| Channel | TX | 8 | 8 | 8 |
| | RX | 8 | 8 | 8 |
| Trace | Number (including ESD, GUARD) | 26 | 37 | 37 |
| | Is the trace coupling regular so it can be removed in SW(Software)? | N/A | Need verification | Need verification |
| Pattern | No odd channels? | O | O | O |
| | No loss of center coordinates in differential sensing mode? | O | X | O |
| | Is self-orthogonality possible? (No multiplication required) | O | X | X |
| | Is the Cm uniform? | X | O | O |
| | Uniform shape? Self cap for each sensor is the same? | X | O | O |
| | All below 200 pF? | O | O | O |
| | Are edge coordinates possible? (Wheel function) | X | O | O |
| | No mix of half node and full node? | O | O | X |
| | Is it possible to distinguish 5 phi touch and water droplet in the center portion? | O | X | O | and the first-2nd electrode (TX2) on the fifth virtual circle (C5). Then, it passes between the second-5th electrode (RX5) and the second-6th electrode (RX6) on the sixth virtual circle (C6). Then, it is included in the trace bundle (B) after passing between the first-3rd electrode (TX3) and the first-2nd electrode (TX2) on the seventh virtual circle (C7).

The second-4th electrodes (RX4), second-5th electrodes (RX5), second-6th electrodes (RX6), and second-7th electrodes (RX7) disposed on the sixth virtual circle (C6) are divided into two groups (first group and second group). Each group includes RX4-RX5-RX6-RX7-RX6-RX5-RX4-RX5-RX6-RX7-RX6-RX5 sequentially arranged clockwise on the sixth virtual circle (C6). The second-4th electrodes (RX4) of each group are connected in series. Other electrodes except for one electrode located at one end of the second-5th electrodes (RX5) are also connected in series. Also, the second-6th electrodes (RX6) are connected in series, and the second-7th electrodes (RX7) are connected in series, also.

A trace connected to any one of the second-4th electrodes (RX4) in the first group, a trace connected to one second-5th electrode (RX5), a trace connected to one second-6th electrode (RX6), and a trace connected to one second-7th electrode (RX7) is included in the trace bundle (B) after passing between the first-5th electrode (TX5) and the first-6th electrode (TX6) on the seventh virtual circle (C7).

A trace connected to any one of the second-4th electrodes (RX4) in the second group, a trace connected to one second-5th electrode (RX5), a trace connected to one second-6th electrode (RX6), and a trace connected to one second-7th electrode (RX7) is included in the trace bundle (A) after passing between the first-2nd electrode (TX2) and first-1st electrode (TX1) on the seventh virtual circle (C7).

Meanwhile, one electrode disposed at one end of the second-5th electrodes (RX5) in the first group is included in the trace bundle (A) after passing between the first-6th electrode (TX6) and the first-7th electrode (TX7) on the seventh virtual circle (C7). In addition, one electrode disposed at one end of the second-5th electrodes (RX5) in the second group is included in the trace bundle (B) after passing between the first-2nd electrode (TX2) and the first-3rd electrode (TX3) on the seventh virtual circle (C7).

The second-0th electrode (RX0) on the concentric circle and the two second-0th electrodes (RX0) on the second virtual circle (C2) are connected through a trace between the first-1st electrode (TX1) and the first-2nd electrode (TX2) on the first virtual circle (C1) and a trace between the first-5th electrode (TX5) and the first-6th electrode (TX6).

A trace connected to one of the two second-0th electrodes (RX0) on the second virtual circle (C2) is included in the trace bundle (A) through between the first-6th electrode (TX6) and the first-7th electrode (TX7) on the third, fifth, and seventh virtual circles (C3, C5, C7). Here, the trace surrounds the first-1st electrode (RX1) located in the middle of the first group on the fourth virtual circle (C4). Then, it passes between the second-1st electrode (RX1) and the second-2nd electrode (RX2) disposed at one end. Then, it passes between the second-5th electrode (RX5) and the second-6th electrode (RX6) in the first group on the sixth virtual circle (C6).

FIG. 18A is a diagram for explaining an electrode pattern structure of a touch sensor 1850 according to another embodiment of the present invention.

The touch sensor 1850 according to another embodiment of the present invention shown in FIG. 18A has fewer channels of the second electrodes (RX0, RX1, RX2, RX3, RX4, RX5) than the touch sensor 550 shown in FIG. 5. Specifically, the number of channels of the second electrodes (RX0, RX1, RX2, RX3, RX4, RX5, RX6, RX7) of the touch sensor 550 shown in FIG. 5A is eight, whereas the number of channels of the second electrodes (RX0, RX1, RX2, RX3, RX4, RX5) of the touch sensor 1850 shown in FIG. 18A is six.

Since the touch sensor 550 shown in FIG. 5 has more channels of the second electrode than the touch sensor 1850 of FIG. 18A, the area per channel is smaller. Therefore, the mutual capacitance value (Cm) between any adjacent first electrode and any second electrode of the touch sensor 550 of FIG. 5 is smaller than the mutual capacitance change (Cm) between any first electrode and any second electrode adjacent to the touch sensor 1850 of FIG. 8 and mutual capacitance change value (ΔCm), and the signal-to-noise ratio (SNR) is expected to decrease. On the other hand, since the touch sensor 1850 of FIG. 18A reduces the number of channels of the second electrodes (RX0, RX1, RX2, RX3, RX4, RX5), the area per channel is larger than that of the touch sensor 550 of FIG. 5. Accordingly, the mutual capacitance value (Cm) and the mutual capacitance change value (ΔCm) between any adjacent first electrode and any second electrode may be increased. Furthermore, it is expected that the signal-to-noise ratio (SNR) may be increased.

In addition, since the number of second electrodes in the touch sensor 1850 of FIG. 18A is reduced more than the number of second electrodes in the touch sensor 550 of FIG. 5, the number of traces may be reduced also. For example, when routing and trace connection are configured in the same manner as in FIGS. 17A and 17B, the number of traces of the touch sensor 550 in FIG. 5 is forty-three, but the number of traces 1850 in FIG. 18A can be further reduced to thirty-nine. Specifically, it will be described later with reference to FIGS. 18B and 18C.

The touch sensor 1850 illustrated in FIG. 18A may have substantially the same top surface area as that of the second-1 st electrode (RX1) and the second-2nd electrode (RX2) as the touch sensor 550 illustrated in FIG. 5. In addition, when the touch sensor 1850 shown in FIG. 18A is described by introducing virtual circles of FIG. 4, the top surface areas of the second electrodes (RX1, RX2) disposed on the fourth virtual circle (C4) may be substantially the same. Also, the second electrodes (RX1, RX2) disposed on the fourth virtual circle (C4) may be alternately arranged.

Referring to the virtual circles of FIG. 4, a part of the second-1st electrode (RX1) and a part of the second-2nd (RX2) may be disposed between the first electrode (TX0) of any one of the first electrodes (TX0 to TX7) disposed on the third virtual circle (C3) and the first electrode (TX0) of any one of the first electrodes (TX0 to TX7) disposed on the fifth virtual circle (C5).

In addition, the touch sensor 1850 illustrated in FIG. 18A may have substantially the same top surface area of the second-3rd electrode (RX3) and the top surface area of the second-5th electrode (RX5) as compared with the touch sensor 550 illustrated in FIG. 5. The top surface area of the second-4th electrode (RX4) may be half of the top surface area of the second-3rd electrode (RX3) and the top surface area of the second-5th electrode (RX5). In addition, when the touch sensor 1850 shown in FIG. 18A is described by introducing virtual circles of FIG. 4, the second electrodes (RX3, RX4, RX5) disposed on the sixth virtual circle (C6) may be arranged to be repeated in the order of RX3-RX4-RX5-RX4.

Referring to the virtual circles of FIG. 4, a part of the second-3rd electrode (RX3), the entire second-4th (RX4), and a part of the second-5th electrode (RX5) may be disposed between the first electrode (TX0) of any one of the first electrodes (TX0 to TX7) disposed on the fifth virtual circle (C53) and the first electrode (TX0) of any one of the first electrodes (TX0 to TX7) disposed on the seventh virtual circle (C7).

FIGS. 18B and 18C are diagrams for explaining a routing and trace connection structure of the touch sensor 1850 shown in FIG. 18A.

Referring to the virtual circle of FIG. 4, the second-1st electrodes (RX1) and the second-2nd electrodes (RX2) disposed on the fourth virtual circle (C4) are divided into two groups (a first group and a second group). Each group includes RX1-RX2-RX1-RX2 continuously arranged clockwise on the fourth virtual circle (C4). The second-1st electrodes (RX1) of each group are connected in series, and the second-2nd electrodes (RX2) are also connected in series.

A trace connected to any one second-1st electrode (RX1) in the first group and a trace connected a trace connected to one second-2nd electrode (RX2) pass between the first-6th electrode (TX6) and the first-7th electrode (TX7) on the fifth virtual circle (C5). Then, it passes between the second-5th electrode (RX5) and the second-4th electrode (RX4) on the sixth virtual circle (C6). Then, it is included in the trace bundle (A) after passing between the first-6th electrode (TX6) and the first-7th electrode (TX7) on the seventh virtual circle (C7).

The trace connected to any one second-1st electrode (RX1) in the second group and the trace connected to one second-2nd electrode (RX2) pass between the first-3rd electrode (TX3) and the first-2nd electrode (TX2) on the fifth virtual circle (C5). Then, it passes between the second-5th electrode (RX5) and the second-4th electrode (RX4) on the sixth virtual circle (C6). Then, it is included in the trace bundle (B) after passing between the first-3rd electrode (TX3) and the first-2nd electrode (TX2) on the seventh virtual circle (C7).

The second-3rd electrodes (RX3), second-4th electrodes (RX4), and second-5th electrodes (RX5) disposed on the sixth virtual circle (C6) are divided into two groups (the first group and the second group). Each group includes RX3-RX4-RX5-RX4-RX3-RX4-RX5-RX4 sequentially arranged clockwise on the sixth virtual circle (C6). The second-3rd electrodes (RX3) of each group are connected in series, and the remaining electrodes except for one electrode located at one end of the second-4th electrodes (RX4) are also connected in series, and the second-5th electrodes (RX5) are also connected in series.

A trace connected to any one second-3rd electrode (RX3) in the first group, a trace connected to one second-4th electrode (RX4), and a trace connected to one second-5th electrode (RX5) are included in the trace bundle (B) through the first-5th electrode (TX5) and the first-6th electrode (TX6) on the seventh virtual circle (C7).

A trace connected to any one second-3rd electrode (RX3) in the second group, a trace connected to one second-4th electrode (RX4), and a trace connected to one second-5th electrode (RX5) are included in the trace bundle (A) through a space between the first-second electrode (TX2) and the first-1st electrode (TX1) on the seventh virtual circle (C7).

Meanwhile, one electrode located at one end of the second-4th electrodes (RX4) in the first group passes between the first-6th electrode (TX6) and the first-7th electrode (TX7) on the seventh virtual circle (C7) and is included in the trace bundle (A). Also, one electrode located at one end of the second-4th electrodes (RX4) in the second group passes between the first-2nd electrode (TX2) and the first-3rd electrode (TX3) on the seventh virtual circle (C7) and is included in the trace bundle (B).

The second-0th electrode (RX0) on the concentric circle and the two second-0th electrodes (RX0) on the second virtual circle (C2) are connected through a trace between the first-1st electrode (TX1) and the first-2nd electrode (TX2) on the first virtual circle (C1) and a trace between the first-5th electrode (TX5) and the first-6th electrode (TX6).

A trace connected to one of the two second-0th electrodes (RX0) on the second virtual circle (C2) is included in the trace bundle (A) through the space between the first-6th electrode (TX6) and the first-7th electrode (TX7) on the third, fifth, and seventh virtual circle (C3, C5, C7). Here, the trace surrounds the first-1st electrode (RX1) located in the middle of the first group on the fourth virtual circle (C4). Then, it passes between the second-1st electrode (RX1) and the second-2nd electrode (RX2) positioned at one end. Then, it passes between the second-5th electrode (RX5) and the second-4th electrode (RX4) in the first group on the sixth virtual circle (C6).

As shown in FIG. 18C, the number of traces of the touch sensor 1850 of FIG. 18A may be thirty-nine in total.

FIG. 19 is a diagram for explaining an electrode pattern structure of a touch sensor 1950 according to another embodiment of the present invention.

The touch sensor 1950 illustrated in FIG. 19 has the same arrangement and diameter of the first electrodes (TX0, . . . , TX7) and the second electrodes (RX0, . . . , RX5) as compared with the touch sensor 1850 illustrated in FIG. 18A. However, widths of some electrodes of the first electrodes (TX0, . . . , TX7) and the second electrodes (RX0, . . . , RX5) are different. This is for improving coordinate accuracy at the outer portion of the touch sensor 1850 of FIG. 18A.

Referring to the virtual circle of FIG. 4, the touch sensor 1950 illustrated in FIG. 19 has longer widths of the first electrodes (TX0, . . . , TX7) disposed on the third virtual circle (C3) and the fifth virtual circle (C5) compared to the touch sensor 1850 illustrated in FIG. 18A. On the other hand, the width of the second electrodes (RX1, . . . , RX5) disposed on the fourth virtual circle (C4) and the sixth virtual circle (C6) is narrower, and the width of the first electrodes (TX0, . . . , TX7) disposed on the seventh virtual circle (C7) is narrower.

Specifically, compare to the touch sensor 1850 shown in FIG. 18A, the touch sensor 1950 shown in FIG. 19 has 0.2 mm longer widths of the first electrodes (TX0, . . . , TX7) disposed on the third virtual circle (C3) and the fifth virtual circle (C5). On the other hand, the widths of the second electrodes (RX1, . . . , RX5) disposed on the fourth virtual circle (C4) and the sixth virtual circle (C6) are 0.1 mm narrower, and the widths of the first electrodes (TX0, . . . , TX7) disposed on the seventh virtual circle are 0.5 mm narrower.

The routing and trace connection structure of the touch sensor 1950 shown in FIG. 19 may be configured as shown in FIGS. 18B and 18C.

Comparing the touch sensor 550 shown in FIG. 5, the touch sensor 1850 shown in FIG. 18A, and the touch sensor 1950 shown in FIG. 19, based on the touch sensor 550 of FIG. 5, the touch sensor 1850 of FIG. 18A reduces the number of RX channels to increase the top surface area of the second electrodes (RX0, . . . , RX5). Accordingly, the touch sensor 1850 illustrated in FIG. 18A may increase the mutual capacitance value (Cm) and the mutual capacitance change values (ΔCm) more than the touch sensor 550 of FIG. 5. Meanwhile, since the touch sensor 1950 of FIG. 19 has the same arrangement of electrodes as the touch sensor 1850 of FIG. 18A, characteristics similar to those of the touch sensor 1850 of FIG. 18A may be obtained.

Table 2 below compares the characteristics of the touch sensor 150 shown in FIG. 2, the touch sensor 550 shown in FIG. 5, the touch sensor 1850 shown in FIG. 18A, and the touch sensor 1950 shown in FIG. 19. In Table 2 below, the touch sensor_1 of FIG. 5 is based on the routing and trace connection of FIG. 11 or 13. Also, the touch sensor_2 of FIG. 5 is based on the routing and trace connection of FIGS. 16 and 17.

TABLE 2

| | | Touch sensor in FIG. 2 | Touch sensor_1 of FIG. 5 | Touch sensor_2 in FIG. 5 | The touch sensor in FIG. 18A | The touch sensor in FIG. 19 |
|---|---|---|---|---|---|---|
| Channel | Diameter [mm] | 35 | 35 | 35 | 35 | 35 |
| | TX | 8 | 8 | 8 | 8 | 8 |
| | RX | 8 | 8 | 8 | 6 | 6 |
| Trace | Number (including ESD, GUARD) | 26 | 37 | 43 | 39 | 39 |
| | Is the trace coupling regular so it can be removed in SW? | N/A | Need verification | Need verification | Need verification | Need verification |
| | Max Trace number between TX-RX | N/A | 9 (540 um) | 6 (380 um) | 5 (320 um) | 5 (320 um) |
| | Max Trace number between RX-RX | N/A | 14 | 7 | 7 | 7 |
| | Max Trace number between TX-TX | N/A | 6 | 7 | 6 | 6 |
| Pattern | No odd channels? | O | O | O | O | O |
| | No loss of center coordinates in differential sensing mode? | O | X | X | X | X |
| | Is self-orthogonality possible? (No multiplication required) | O | X | X | X | X |
| | Is the Cm uniform? | X | O | O | O | O |
| | Uniform shape? Self cap for each sensor is the same? | X | O | O | O | O |
| | All below 200 pF? | O | O | O | O | O |
| | Are edge coordinates possible? (Wheel function) | X | O | O | O | O |
| | No mix of half node and full node? | O | Δ | Δ | Δ | Δ |
| | Is it possible to distinguish 5 phi touch and water droplet in the center portion? | O | O | O | O | O |
| Simulation result (Sim.) | Average Cm (fF) | N/A | 178 | 211 | 285 | 295 |
| | Average Cs (TX) (pF) | N/A | 95.4 | 104 | 124 | 124 |
| | Average Cs (RX) (pF) | N/A | 97.8 | 104 | 124 | 123 |
| | Max Delta Cm (fF) | N/A | 56.6 | 66.1 | 101.3 | 107.3 |
| | Max Delta Cm/C (%) | N/A | 31.8 | 31.3 | 35.5 | 36.4 |
| | Min Delta Cm (fF) | N/A | 34.0 | 38.5 | 49.2 | 48.5 |
| | Min Delta Cm/C (%) | N/A | 19.1 | 18.2 | 17.3 | 16.4 |

TABLE 2-continued

|  |  | Touch sensor in FIG. 2 | Touch sensor_1 of FIG. 5 | Touch sensor_2 in FIG. 5 | The touch sensor in FIG. 18A | The touch sensor in FIG. 19 |
|---|---|---|---|---|---|---|
| Sim.1 (Line) | Max error (mm) (≤1.00 mm) | N/A | — | 0.29 | 0.36 | 0.21 |
|  | RMS error (mm) (≤1.00 mm) | N/A | — | 0.12 | 0.15 | 0.10 |
| Sim.2 (R) | Max error (mm) (≤1.00 mm) | N/A | — | 0.39 | 0.46 | 0.23 |
|  | RMS error (mm) (≤1.00 mm) | N/A | — | 0.12 | 0.12 | 0.11 |
| Sim.3 (Theta) | Max error (mm) (≤1.00 mm) | N/A | — | 0.51 | 0.59 | 0.33 |
|  | RMS error (mm) (≤1.00 mm) | N/A | — | 0.50 | 0.57 | 0.30 |

FIG. 20 shows simulation environments for obtaining the simulation results described in Table 2, and applying YOCTA stack-up.

FIG. 21 shows a simulation that confirms the base mutual capacitance value (Cm) in the untouched state of the touch sensor_2 550 illustrated in FIG. 5, the touch sensor 1850 illustrated in FIG. 18A, and the touch sensor 1950 illustrated in FIG. 19 to obtain the result of the simulation described in Table 2. The solid line is the point showing the optimal mutual capacitance change, and the dotted line is the point showing the worst mutual capacitance change.

In FIG. 21, each candidate group of the Max diff node and the min diff node is selected and simulated. Also, as shown in Table 2, max delta Cm and min delta Cm could be organized, and the simulation value of the self-capacitance value (Cs) for each sensor could be compared.

FIG. 22A to FIG. 22C show actual simulation output data in the state of FIG. 21. Specifically, FIG. 22A shows simulation output data of touch sensor_2 550 shown in FIG. 5, FIG. 22B shows simulation output data of touch sensor 1850 shown in FIG. 18A, and FIG. 22C shows simulation output data of touch sensor 1950 shown in FIG. 19.

Referring to the table of FIG. 22A, it may be confirmed that an average Cm (Average Cm) is approximately 211 (fF). Meanwhile, referring to the table in FIG. 22B, it may be confirmed that the average Cm (Average Cm) was approximately 285 (fF), which was approximately 35% higher than the average Cm in FIG. 22A. Also, referring to the table in FIG. 22C, it may be confirmed that the average Cm (Average Cm) was approximately 295 (fF), which was approximately 39.8% higher than the average Cm in FIG. 22A.

Figure 23:
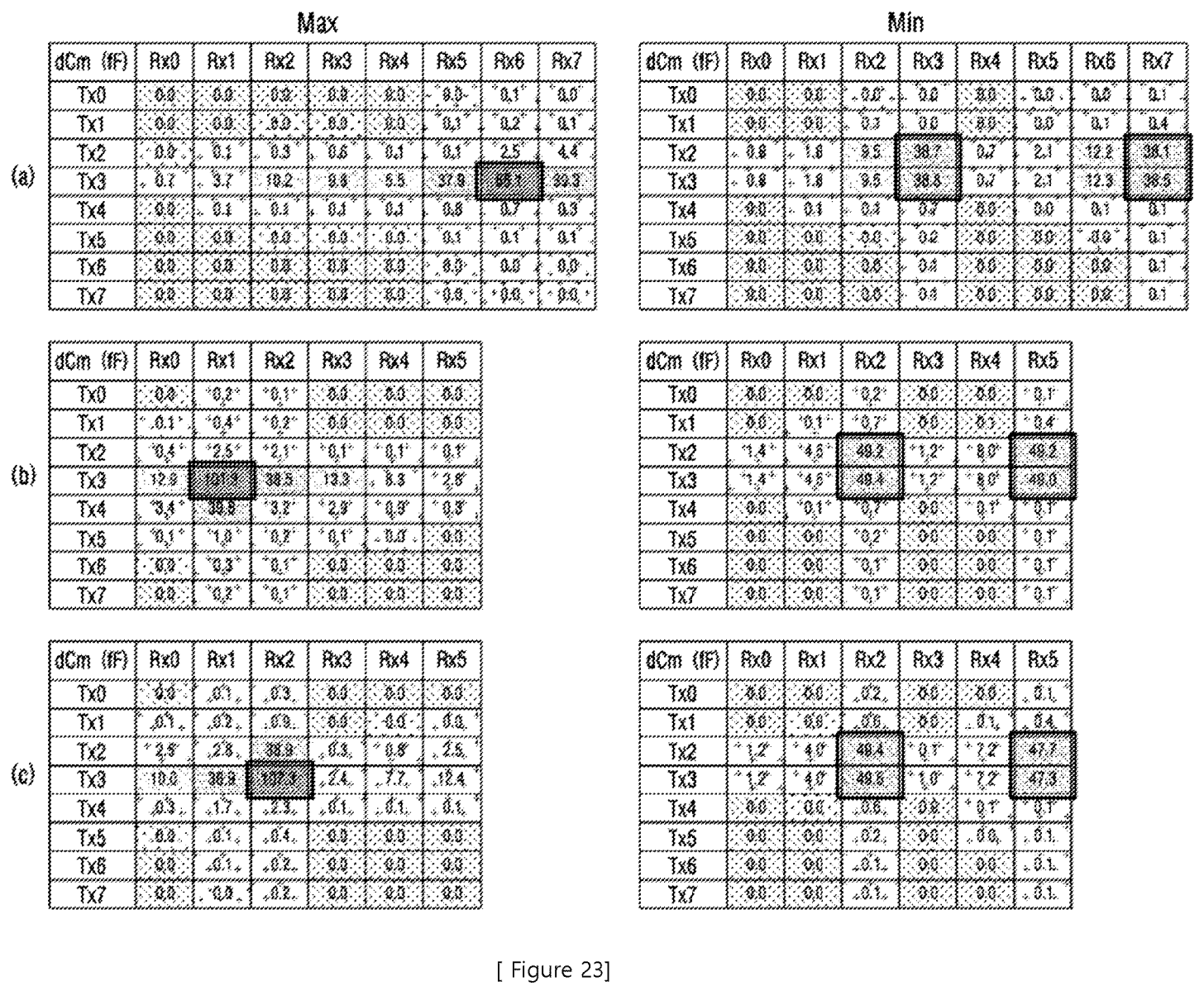

FIGS. 23A to 23C are graphs comparing how much Cm changes at the point where the mutual capacitance change (ΔCm) occurs at maximum (Max) and minimum (Min) in the touch sensor_2 550 shown in FIG. 5, the touch sensor 1850 shown in FIG. 18A and the touch sensor 1950 shown in FIG. 19. Specifically, FIG. 23A shows simulation output data of touch sensor_2 550 shown in FIG. 5, FIG. 23B shows simulation output data of touch sensor 1850 shown in FIG. 18A, and FIG. 23C shows simulation output data of touch sensor 1950 shown in FIG. 19. Specifically, FIG. 23A shows simulation output data of touch sensor_2 550 shown in FIG. 5, FIG. 23B shows simulation output data of touch sensor 1850 shown in FIG. 18A, and FIG. 23C shows simulation output data of touch sensor 1950 shown in FIG. 19.

In FIG. 23A, the maximum mutual capacitance change (Max delta Cm) was 66.1 (fF), and Max Delta Cm/C was confirmed to be 31.3%. Also, the minimum mutual capacitance change (Min delta Cm) was 38.5 (fF), and Min Delta Cm/C was confirmed to be 18.2%.

In FIG. 23B, the maximum mutual capacitance change (Max delta Cm) was 101.3 (fF), and Max Delta Cm/C was confirmed to be 35.5%. Also, the minimum mutual capacitance change (Min delta Cm) was 49.2 (fF), and Min Delta Cm/C was confirmed to be 17.3%. Based on these results, it may be confirmed that the touch sensor 1850 of FIG. 18A has a 53% increase in Max delta Cm and a 27% increase in Min delta Cm compared to the touch sensor_2 550 of FIG. 5.

In FIG. 23C, the maximum mutual capacitance change (Max delta Cm) was 107.3 (fF), and Max Delta Cm/C was confirmed to be 36.4%. Also, the minimum mutual capacitance change (Min delta Cm) was 48.5 (fF), and Min Delta Cm/C was confirmed to be 16.4%. Based on these results, it may be confirmed that the touch sensor 1950 of FIG. 19 has an increase of approximately 63% in Max delta Cm and approximately 25% in MM delta Cm compared to the touch sensor_2 550 of FIG. 5.

FIG. 24A to FIG. 24C are output data simulating the self-capacitance (Cs) of the touch sensor_2 550 shown in FIG. 5, the touch sensor 1850 shown in FIG. 18A, and the touch sensor 1950 shown in FIG. 19, respectively. Specifically, FIG. 24A shows simulation output data of touch sensor_2 550 shown in FIG. 5, FIG. 24B shows simulation output data of touch sensor 1850 shown in FIG. 18A, and FIG. 24C shows simulation output data of touch sensor 1950 shown in FIG. 19.

Referring to FIG. 24A to FIG. 24C, it may be confirmed that uniform Cs values are output from the first electrodes (TX0, . . . , TX7) and the second electrodes (RX0, . . . , RX7, or RX0, . . . , RX5) as a whole.

FIG. 25 shows three simulations (Sim.1, Sim.2, Sim.3) performed with a 5-phi conductive rod for each of the touch sensor_2 550 illustrated in FIG. 5, the touch sensor 1850 illustrated in FIG. 18A, and the touch sensor 1950 illustrated in FIG. 19 to obtain the results of Simulations1 (Sim.1), Simulations2 (Sim.2), and Simulations3 (Sim.3).

Referring to FIG. 25, the left drawing shows a straight line touch, the middle drawing shows a theta line touch, and the right drawing shows a wheel touch.

The result values of Simulation) (Sim.1), Simulation2 (Sim.2), and Simulation3 (Sim.3) described in Table 2 are compared by calculating the max/rms value of the accuracy at each simulation point.

FIG. 26 is a diagram simulating a maximum error (Max error) and an RMS error (RMS error) when a straight line touch of the left drawing of FIG. 25 is performed on each of the touch sensor_2 550 shown in FIG. 5, the touch sensor 1850 shown in FIG. 18A, and the touch sensor 1950 shown in FIG. 19, respectively. Also, FIG. 27 is a graph of a maximum error (Max error) and an RMS error (RMS error) for each position (1, 2, 3, 4). In FIG. 26, (A) means a touch sensor_2 550 shown in FIG. 5, (B) means a touch sensor 1850 shown in FIG. 18A, and (C) means a touch sensor 1950 shown in FIG. 19.

As shown in FIGS. 26 and 27, by adjusting the width of the electrodes of the touch sensor 1950 shown in FIG. 19, the maximum error (Max error) and the RMS error (RMS error) may be reduced more than the touch sensors 550 and 1850 of FIGS. 5 and 18A.

FIG. 28 is a diagram simulating the maximum error (Max error) and the RMS error (RMS error) when theta line touch in the middle drawing of FIG. 25 is performed on each of the touch sensor_2 550 shown in FIG. 5, the touch sensor 1850 shown in FIG. 18A, and the touch sensor 1950 shown in FIG. 19, respectively. Also, FIG. 29 is graphs of a maximum error (Max error) and an RMS error (RMS error) for each angle (1, 2, 3). In FIG. 28, (A) means a touch sensor_2 550 shown in FIG. 5, (B) means a touch sensor 1850 shown in FIG. 18A, and (C) means a touch sensor 1950 shown in FIG. 19.

As shown in FIGS. 28 and 29, by adjusting the width of the electrodes of the touch sensor 1950 shown in FIG. 19, it may be confirmed that the maximum error (Max error) and the RMS error (RMS error) may be reduced more than the touch sensor_2 550 of FIG. 5 and the touch sensor 1850 of FIG. 18A.

FIG. 30 is a diagram simulating a maximum error (Max error) and an RMS error (RMS error) when a wheel touch in the right drawing of FIG. 25 is performed on each of the touch sensor_2 550 shown in FIG. 5, the touch sensor 1850 shown in FIG. 18A, and the touch sensor 1950 shown in FIG. 19. Also, FIG. 31 is graphs of a maximum error (Max error) and an RMS error (RMS error) for each wheel position (1, 2). In FIG. 30, (A) means a touch sensor_2 550 shown in FIG. 5, (B) means a touch sensor 1850 shown in FIG. 18A, and (C) means a touch sensor 1950 shown in FIG. 19.

As shown in FIGS. 30 and 31, by adjusting the width of the electrodes of the touch sensor 1950 shown in FIG. 19, it might be confirmed that the maximum error (Max error) and the RMS error (RMS error) could be reduced more than the touch sensor_2 550 of FIG. 5 and the touch sensor 1850 of FIG. 18A.

FIG. 32 is a diagram for explaining an electrode pattern structure of the touch sensor 3250 according to another embodiment of the present invention.

Referring to FIG. 32, the touch sensor 3250 according to another embodiment of the present invention is different in configuration from the touch sensor 350 shown in FIG. 3 in the second electrodes (RX1, RX2, RX3, RX4, RX5, RX6, RX7) except for the second-0th electrode (RX0).

Specifically, referring to the virtual circles shown in FIG. 7, the touch sensor 3250 of FIG. 32 includes second-1st electrodes (RX1), second-2nd electrodes (RX2), and second-3rd electrodes (RX3) disposed on the fourth virtual circle (C4), and the sequence of RX1-RX2-RX3 is repeated. In addition, one second-1st electrode (RX1), one second-2nd electrode (RX2), and one second-3rd electrode (RX3) are disposed between any one electrode (TX0) of the first electrodes (TX0 to TX7) on the third virtual line (C3) and any one electrode (TX0) of the first electrodes (TX0 to TX7) on the fifth virtual line (C5). Here, one second-1st electrode (RX1), one second-2nd electrode (RX2), and one second-3rd electrode (RX3) may have substantially the same top surface area.

The touch sensor 3250 of FIG. 32 includes second-4th electrodes (RX4), second-5th electrodes (RX5), second-6th electrodes (RX6), and second-7th electrodes (RX7) disposed on the sixth virtual circle (C6), and the order of RX4-RX5-RX6-RX7 is arranged to be repeated. In addition, one second-4th electrode (RX4), one second-5th electrode (RX5), one second-6th electrode (RX6), and one second-7th electrode (RX7) are disposed between any one electrode (TX0) of the first electrodes (TX0 to TX7) on the fifth virtual line (C5) and any one electrode (TX0) of the first electrodes (TX0 to TX7) on the seventh virtual line (C7). Here, one second-4th electrode (RX4), one second-5th electrode (RX5), one second-6th electrode (RX6), and one second-7th electrode (RX7) may have substantially the same top surface area.

FIG. 33 is a diagram showing a routing and trace connection structure of the touch sensor 3250 shown in FIG. 32.

Referring to FIG. 33 by introducing the virtual circle of FIG. 4, the second-1st electrodes (RX1) disposed on the fourth virtual circle (C4) are connected in parallel to each other through a trace, and the second-3rd electrodes (RX3) are also connected in parallel to each other through a trace. Meanwhile, the second-2nd electrodes (RX2) are connected in series through a trace.

The second-1st electrodes (RX1) are connected in parallel through traces connected to one side of each of the second-1st electrodes (RX1). Also, the second-3rd electrodes (RX3) are connected in parallel through traces connected to the other sides of each of the second-3rd electrodes (RX3). In addition, the second-2nd electrodes (RX2) are connected in series with adjacent ones. The trace connecting the two second-2nd electrodes (RX2) that are close to each other passes between the second-3rd electrode (RX3) and the second-1 st electrode (RX1) disposed between two adjacent second-2nd electrodes (RX2).

The second-4th electrodes (RX4) disposed on the sixth virtual circle (C6) are connected in parallel with each other through a trace, and the second-7th electrodes (RX7) are also connected in parallel with each other through a trace. Meanwhile, the second-5th electrodes (RX5) are connected in series through traces, and the second-6th electrodes (RX6) are also connected in series through traces.

The second-4th electrodes (RX4) are connected in parallel through traces connected to one side of each of the second-4th electrodes (RX4), and the second-7th electrodes (RX7) are connected in parallel through traces connected to the other sides of each of the second-7th electrodes (RX7). In addition, the 2-5th electrodes RX5 are connected in series with adjacent ones. The trace connecting the two second-5th electrodes (RX5) that are close to each other passes between the second-7th electrode (RX7) and the second-4th electrode (RX4) disposed between two adjacent second-5th electrodes (RX5). Also, the second-6th electrodes (RX6) are connected in series with adjacent ones. The trace connecting the two second-6th electrodes (RX6) that are close to each other passes between the second-7th electrode (RX7) and the second-4th electrode (RX4) disposed between two adjacent second-6th electrodes (RX6).

Meanwhile, as another embodiment of the present invention, an arrangement structure and a routing structure of second electrodes (RX1, RX2, RX3, RX4, RX5, RX6, RX7) excluding the second-0th electrode (RX0) shown in FIG. 32 may be introduced to the touch sensor 550 shown in FIG. 5.

FIG. 34 is a diagram for explaining the electrode pattern structure of the touch sensor 3450 according to another embodiment of the present invention.

Referring to FIG. 34, the touch sensor 3450 according to another embodiment of the present invention has a configuration difference in which the number of channels of the second electrodes is reduced compared to the touch sensor 3250 illustrated in FIG. 2.

Specifically, in the touch sensor 3250 of FIG. 32, second electrodes (RX0 to RX7) configure eight channels, while in the touch sensor 3450 of FIG. 34, second electrodes (RX0 to RX5) configure six channels.

Referring to the virtual circles shown in FIG. 7, the touch sensor 3450 of FIG. 34 includes second-1st electrodes (RX1) and second-2nd electrodes (RX2) disposed on the fourth virtual circle (C4), and the order of RX1-RX2 is arranged to be repeated. In addition, one second-1st electrode (RX1) and one second-2nd electrode (RX2) are disposed between any one electrode (TX0) of the first electrodes (TX0 to TX7) on the third virtual line (C3) and any one electrode (TX0) of the first electrodes (TX0 to TX7) on the fifth virtual line (C5). Here, one second-1st electrode (RX1) and one second-2nd electrode (RX2) may have substantially the same top surface area.

The touch sensor 3450 of FIG. 34 includes second-3rd electrodes (RX3), second-4th electrodes (RX4), and second-5th electrodes (RX5) disposed on the sixth virtual circle (C6), and the order of RX3-RX4-RX5 is arranged to be repeated. Also, one second-3rd electrode (RX3), one second-4th electrode (RX4), and one second-5th electrode (RX5) are disposed between any one electrode (TX0) of the first electrodes (TX0 to TX7) on the fifth virtual line (C5) and any one electrode (TX0) of the first electrodes (TX0 to TX7) on the seventh virtual line (C7). Here, one second-third electrode (RX3), one second-fourth electrode (RX4), and one second-fifth electrode (RX5) may have substantially the same top surface area.

FIG. 35 is a diagram showing a routing and trace connection structure of the touch sensor 3450 shown in FIG. 34.

Referring to FIG. 35 by introducing the virtual circle of FIG. 4, the second-1 st electrodes (RX1) disposed on the fourth virtual circle (C4) are connected in parallel to each other through a trace, and the second-2nd electrodes (RX2) are also connected in parallel to each other through a trace.

The second-1st electrodes (RX1) are connected in parallel through traces connected to one side of the second-1st electrodes (RX1), and the second-3rd electrodes (RX3) are connected in parallel through traces connected to the other side of the second-3rd electrodes (RX3).

The second-3rd electrodes (RX3) disposed on the sixth virtual circle (C6) are connected in parallel with each other through a trace, and the second-5th electrodes (RX5) are also connected in parallel with each other through a trace. Meanwhile, the second-4th electrodes (RX4) are connected in series through a trace.

The second-3rd electrodes (RX3) are connected in parallel through a trace connected to one side of each of the second-3rd electrodes (RX3). Also, the second-5th electrodes (RX5) are connected in parallel through a trace connected to the other side of each of the second-5th electrodes (RX5). In addition, the second-4th electrodes (RX4) are connected in series with adjacent ones, and the trace connecting the two second-4th electrodes (RX4) that are close to each other pass between the second-5th electrode (RX5) and the second-3rd electrode (RX3) disposed between the two second-4th electrodes (RX4) that are close to each other.

Meanwhile, as another embodiment of the present invention, the touch sensor 550 shown in FIG. 5 may be introduced an arrangement structure and a routing structure of the second electrodes (RX1, RX2, RX3, RX4, RX5) excluding the second-0th electrode (RX0) shown in FIG. 34.

The features, structures, effects, etc. described in the embodiments above are included in one embodiment of the present invention, and are not necessarily limited to only one embodiment. Furthermore, the features, structures, effects, etc. illustrated in each embodiment can be combined or modified with respect to other embodiments by those skilled in the art in the field to which the embodiments belong. Therefore, contents related to these combinations and variations should be construed as being included in the scope of the present invention.

In addition, although the embodiment has been mainly described above, this is only an example and does not limit the present invention. Also, those of ordinary skill in the field to which this invention pertains will see that various modifications and applications not illustrated above are possible without departing from the essential characteristics of this embodiment. For example, each component specifically shown in the embodiment may be modified and implemented. Additionally, differences related to such modifications and applications should be interpreted as falling within the scope of the present invention as defined in the scope of the appended claims.

DESCRIPTION OF SYMBOLS

100: smartwatch
150, 350, 550, 1850, 1950, 2150, 3450: touch sensor

The invention claimed is:
1. A touch input device comprising a circular touch sensor, wherein the touch sensor includes a plurality of electrodes disposed on a single layer and spaced apart from each other on a plurality of virtual circles having a common center, wherein the plurality of virtual circles includes a first to a seventh virtual circles, wherein the plurality of electrodes includes a plurality of first electrodes and a plurality of second electrodes, wherein the plurality of the first electrodes includes a first-0th to a first-7th electrodes disposed on each of a first, a third, a fifth, and a seventh virtual circles among a first to a seventh virtual circles, and the plurality of second electrodes comprising:
one or a plurality of second-0th electrodes disposed on the second virtual circle;
a plurality of second-1 st electrodes, a plurality of second-2nd electrodes, and a plurality of second-3rd electrodes disposed on the fourth virtual circle;
a plurality of second-4th electrodes, a plurality of second-5th electrodes, a plurality of second-6th electrodes, and a plurality of second-7th electrodes disposed on the sixth virtual circle.

2. The touch input device according to claim 1, wherein the plurality of first electrodes is one of a driving electrode for outputting a driving signal and a receiving electrode for receiving a sensing signal, and the plurality of second electrodes is the other when the touch sensor is driven in a mutual driving mode.

3. The touch input device according to claim 1,
wherein the plurality of second-1st electrodes, the plurality of second-2nd electrodes, and the plurality of second-3rd electrodes are arranged such that the arrangement order of the second-1st electrode—the second-2nd electrode—the second-3rd electrode—the second-2nd electrode is repeated, and
wherein the plurality of second-4th electrodes, the plurality of second-5th electrodes, the plurality of second-6th electrodes, and the plurality of second-7th electrodes are arranged such that the arrangement order of the second-4th electrode—the second-5th electrode—the second-6th electrode—the second-7th electrode—the second-6th electrode—the second-5th electrode is repeated.

4. The touch input device according to claim 3,
wherein a top surface area of the second-1st electrode and the second-3rd electrode is larger than a top surface area of the second-2nd electrode,
wherein a top surface area of the second-4th electrode and the second-7th electrode is larger than a top surface area of the second-5th electrode and the second-6th electrode,
wherein a part of the second-1 st electrode, entire the second-2nd electrode, and a part of the second-3rd electrode are disposed between any one of the first-0th to the first-7th electrodes disposed on the third virtual circle and any one of the first-0th to the first-7th electrodes disposed on the fifth virtual circle, and
wherein a part of the second-4th electrode, entire the second-5th electrode, entire the second-6th electrode, and a part of the second-7th electrode are disposed between any one of the first-0th to the first-7th electrodes disposed on the fifth virtual circle and any one of the first-0th to the first-7th electrodes disposed on the seventh virtual circle.

5. The touch input device according to claim 1,
wherein the plurality of the second-1st electrodes, the plurality of the second-2nd electrodes, and the plurality of the second-3rd electrodes are arranged such that the arrangement order of the second-1st electrode—the second-2nd electrode—the second-3rd electrode is repeated, and wherein the plurality of the second-4th electrodes, the plurality of the second-5th electrodes, the plurality of the second-6th electrodes, and the plurality of the second-7th electrodes are arranged such that the arrangement order of the second-4th electrode—the second-5th electrode—the second-6th—the second-7th electrode is repeated.

6. The touch input device according to claim 5,
wherein top surface areas of the second-1 st electrode, the second-2nd electrode, and the second-3rd electrode are the same as each other,
wherein the top surface areas of the second-4th electrode, the second-5th electrode, the second-6th electrode, and the second-7th electrode are the same as each other,
wherein the second-1 st electrode, the second-2nd electrode, and the second-3rd electrode are disposed on between any one of the first-0th to the first-7th electrodes disposed on the third virtual circle and any one of the first-0th to the first-7th electrodes disposed on the fifth virtual circle, and
wherein the second-4th electrode, the second-5th electrode, the second-6th electrode, and the second-7th electrode are disposed on between any one of the first-0th to the first-7th electrodes disposed on the fifth virtual circle and any one of the first-0th to the first-7th electrodes disposed on the seventh virtual circle.

7. The touch input device according to claim 1, wherein the second-0th electrode is further disposed on the center.

8. A touch input device comprising a circular touch sensor, wherein the touch sensor includes a plurality of electrodes disposed on a single layer and spaced apart from each other on a plurality of virtual circles having a common center,
wherein the plurality of virtual circles includes the first to the seventh virtual circles,
wherein the plurality of electrodes includes the plurality of the first electrodes and the plurality of the second electrodes,
wherein the plurality of the first electrodes includes the first-0th to the first-7th electrodes disposed on each of the first, the third, the fifth, and the seventh virtual circles among the first to the seventh virtual circles,
the plurality of the second electrodes comprising:
a one or the plurality of the second-0th electrodes disposed on the second virtual circle;
the plurality of the second-1 st electrodes and the plurality of second-2nd electrodes disposed on the fourth virtual circle;
the plurality of the second-3rd electrodes, the plurality of second-4th electrodes, and a plurality of second-5th electrodes disposed on the sixth virtual circle.

9. The touch input device according to claim 8, wherein the plurality of the first electrodes is one of the driving electrodes for outputting the driving signal and a receiving electrode for receiving a sensing signal, and the plurality of the second electrodes is the other when the touch sensor is driven in the mutual driving mode.

10. The touch input device according to claim 8,
wherein the plurality of the second-1 st electrodes and the plurality of the second-2nd electrodes are arranged such that the arrangement order of the second-1st electrode—the second-2nd electrode is repeated, and
wherein the plurality of the second-3rd electrodes, the plurality of the second-4th electrodes, and the plurality of the second-5th electrodes are arranged such that the arrangement order of the second-3rd electrode—the second-4th electrode—the second-5th— the second-4th electrode is repeated.

11. The touch input device according to claim 8,
wherein a top surface areas of the second-1 st electrode and the second-2nd electrode are the same as each other,
wherein a top surface areas of the second-3rd electrode and the second-5th electrode are the same as each other,
wherein a top surface area of the second-4th electrode is half of a top surface area of the second-3rd electrode and the second-5th electrode,
wherein the part of the second-1st electrode and the part of the second-2nd electrode are disposed on between any one of the first-0th to the first-7th electrodes disposed on the third virtual circle and any one of the first-0th to the first-7th electrodes disposed on the fifth virtual circle, and
wherein the part of the second-3rd electrode, entire the second-4th electrode, and the part of the second-5th electrode are disposed on between any one of the first-0th to the first-7th electrodes disposed on the fifth virtual circle and any one of the first-0th to the first-7th electrodes disposed on the seventh virtual circle.

12. The touch input device according to claim 8,
wherein the top surface areas of the second-1st electrode and the second-2nd electrode are the same as each other,
wherein the top surface areas of the second-3rd electrode, the second-4th electrode, and the second-5th electrode are the same as each other,
wherein the second-1st electrode and the second-2nd electrode are disposed on between any one of the first-0th to the first-7th electrodes disposed on the third virtual circle and any one of the first-0th to the first-7th electrodes disposed on the fifth virtual circle, and
wherein the second-3rd electrode, the second-4th electrode, and the second-5th electrode are disposed between any one of the first-0th to the first-7th electrodes disposed on the fifth virtual circle and any one of the first-0th to the first-7th electrodes disposed on the seventh virtual circle.

13. The touch input device according to claim 8, wherein the second-0th electrode is further disposed on the center.

14. A touch sensor comprising a plurality of first electrodes and a plurality of second electrodes,
wherein the plurality of first electrodes includes first electrodes of a first group; first electrodes of a second group surrounding the first electrodes of the first group; first electrodes of a third group surrounding the first electrodes of the second group; and first electrodes of a fourth group surrounding the first electrodes of the third group; and
wherein the plurality of second electrodes includes one or a plurality of second-0th electrodes disposed between the first electrode of the first group and the first electrode of the second group; a plurality of second-1 st electrodes, a plurality of second-2nd electrodes, and a plurality of second-3rd electrodes are disposed between the first electrodes of the second group and the first electrodes of the third group; and a plurality of second-4th electrodes, a plurality of second-5th electrodes, a plurality of second-6th electrodes, and a plurality of second-7th electrodes are disposed between the first electrodes of the third group and the first electrodes of the fourth group.

15. The touch sensor according to claim 14,
wherein the plurality of first electrodes is one of a driving electrode for outputting a driving signal and a receiving electrode for receiving a sensing signal, and the plurality of second electrodes are the other.

16. The touch sensor according to claim 14,
the second-0th electrode is further disposed in a region surrounded by the first electrodes of the first group.

17. A touch sensor comprising a plurality of first electrodes and a plurality of second electrodes,
wherein the plurality of first electrodes includes first electrodes of a first group; first electrodes of a second group surrounding the first electrodes of the first group; first electrodes of a third group surrounding the first electrodes of the second group; and first electrodes of a fourth group surrounding the first electrodes of the third group, and
wherein the plurality of second electrodes includes one or a plurality of second-0th electrodes disposed between the first electrodes of the first group and the first electrodes of the second group; a plurality of second-1 st electrodes and a plurality of second-2nd electrodes disposed between the first electrodes of the second group and the first electrodes of the third group; and a plurality of second-3rd electrodes, a plurality of second-4th electrodes, and a plurality of second-5th electrodes disposed between the first electrodes of the third group and the first electrodes of the fourth group.

18. The touch sensor according to claim 17,
wherein the plurality of first electrodes is one of a driving electrode for outputting a driving signal and a receiving electrode for receiving a sensing signal, and the plurality of second electrodes are the other.

19. The touch sensor according to claim 17,
the second-0th electrode is further disposed in a region surrounded by the first electrodes of the first group.

* * * * *